(12) United States Patent
Mohri

(10) Patent No.: US 6,587,844 B1
(45) Date of Patent: Jul. 1, 2003

(54) SYSTEM AND METHODS FOR OPTIMIZING NETWORKS OF WEIGHTED UNWEIGHTED DIRECTED GRAPHS

(75) Inventor: Mehryar Mohri, New York, NY (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/495,174

(22) Filed: Feb. 1, 2000

(51) Int. Cl.$^7$ .......................... G06F 15/18; G10L 15/14

(52) U.S. Cl. .......................... 706/20; 706/12; 704/256; 704/257

(58) Field of Search .............................. 706/12, 20, 13, 706/16, 27; 704/256, 257

(56) References Cited

U.S. PATENT DOCUMENTS

| | | | |
|---|---|---|---|
| 5,166,927 A | * 11/1992 | Iida et al. | 370/60 |
| 5,270,919 A | * 12/1993 | Blake et al. | 364/401 |
| 5,483,470 A | * 1/1996 | Alur et al. | 716/6 |
| 5,487,117 A | * 1/1996 | Burges et al. | 382/173 |
| 5,546,503 A | * 8/1996 | Abe et al. | 395/23 |
| 5,678,677 A | * 10/1997 | Baudat | 194/206 |
| 5,806,032 A | * 9/1998 | Sproat | 704/255 |
| 5,870,564 A | * 2/1999 | Jensen et al. | 395/200.71 |
| 6,041,138 A | * 3/2000 | Nishida | 382/197 |
| 6,067,572 A | * 5/2000 | Jensen et al. | 709/241 |
| 6,088,689 A | * 7/2000 | Kohn et al. | 706/10 |
| 6,222,559 B1 | * 4/2001 | Asano et al. | 345/440 |
| 6,243,679 B1 | * 6/2001 | Mohri et al. | 704/256 |
| 6,359,571 B1 | * 3/2002 | Endo et al. | 340/988 |
| 6,456,971 B1 | * 9/2002 | Mohri et al. | 704/256 |
| 6,490,519 B1 | * 12/2002 | Lapidot et al. | 701/117 |

OTHER PUBLICATIONS

Babb et al.; "Solving graph problems with dynamic computation structures". NEC Research Index, The International Society for Optical Engineering, 1996, p. 225–236, Retrieved from the Internet: http://citeser.nj.nec.com/babb96solving.html.*

Stalin et al.; "Vectorized Backpropagation and Automatic Pruning for MLP Network Optimization". IEEE International Conference on Neural Networks, Mar. 1993, vol. 3, p. 1427–1432.*

Yan, H.; "Two–Layer Perceptron for Nearest Neighbor Classifier Optimization". International Joint Conference on Neural Networks, Jun. 1992, vol. 3, p. 585–590.*

Verwer et al.; "An Efficient Uniform Cost Algorithm Applied to Distance Transforms". IEEE Transactions on Pattern Analysis and Machine Intelligence, Apr. 1989, vol. 11, Iss. 4, p. 425–429.*

Yener et al.; "Iterative Approach to Optimizing Convergence Routing Priorities". IEEE/ACM Transactions on Networking, Aug. 1997, vol. 4, No. 4, p. 530–542.*

Cohen et al.; "Dynamic Expression Trees and Their Applications". Proceedings of the Second Annual ACM–SIAM Symposium on Discrete Algorithms, 1991, p. 52–61.*

Nichani, S.; "Solving the Correspondence Problem Using a Hopfield Network". 1994 IEEE International Conference on Neural Networks, Jun. 1994, vol. 6, p. 4107–4112.*

* cited by examiner

Primary Examiner—John Follansbee
Assistant Examiner—Kelvin Booker
(74) Attorney, Agent, or Firm—Duane S. Kobayashi

(57) ABSTRACT

Unweighted finite state automata may be used in speech recognition systems, but considerably reduce the speed and accuracy of the speech recognition system. Unfortunately, developing a suitable training corpus for a speech recognition task is time consuming and expensive, if it is even possible. Additionally, it is unlikely that a training corpus could adequately reflect the various probabilities for the word and/or phoneme combinations. Accordingly, such very-large-vocabulary speech recognition systems often must be used in an unweighted state. The directed graph optimizing systems and methods determine the shortest distances between source and end nodes of a weighted directed graph. These various directed graph optimizing systems and methods also reweight the directed graph based on the determined shortest distances, so that the weights are, for example, front weighted. Accordingly, searches through the directed graph that are based on the total weights of the paths taken will be more efficient. Various directed graph optimizing systems and methods also arbitrarily weight an unweighted directed graph so that the shortest distance and reweighting systems and methods can be used.

52 Claims, 10 Drawing Sheets

FIG. 1

```
GENERIC-SINGLE-SOURCE-SHORTEST-DISTANCE (G, s)
1  for i ← 1 to |Q|
2      do d[i] ← r[i] ← 0̄
3  d[s] ← r[s] ← 1̄
4  S ← {s}
5  while S ≠ ∅
6      do q ← head(S)
7         DEQUEUE(S)
8         r ← r[q]
9         r[q] ← 0̄
10        for each e ∈ E[q]
11            do if d[n[e]] ≠ d[n[e]] ⊕ (r ⊗ w[e])
12                then d[n[e]] ← d[n[e]] ⊕ (r ⊗ w[e])
13                     r[n[e]] ← r[n[e]] ⊕ (r ⊗ w[e])
14                     if n[e] ∉ S
15                         then ENQUEUE(S, n[e])
16 d[s] ← 1̄
```

FIG. 2

```
GENERIC-TOPOLOGICAL-SINGLE-SOURCE-SHORTEST-DISTANCE (G, s)

1  for i ← 1 to |Q|
2      do d[i] ← r[i] ← $\overline{0}$
3  d[s] ← r[s] ← $\overline{1}$
4  for each SCC X considered in topological order
5      do SCC-SINGLE-SOURCE-SHORTEST-DISTANCE (G, X)
18 d[s] ← $\overline{1}$

SCC-SINGLE-SOURCE-SHORTEST-DISTANCE (G, X)

6  S ← {q ∈ X : r[q] ≠ $\overline{0}$}
7  while S ≠ ∅
8      do q ← head(S)
9         DEQUEUE(S)
10        r ← r[q]
11        r[q] ← $\overline{0}$
12        for each e ∈ E[q]
13           do if d[n[e]] ≠ d[n[e]] ⊕ (r ⊗ w[e])
14              then d[n[e]] ← d[n[e]] ⊕ (r ⊗ w[e])
15                   r[n[e]] ← r[n[e]] ⊕ (r ⊗ w[e])
16              if n[e] ∉ S and n[e] ∉ X
17                 then ENQUEUE(S, n[e])
```

FIG. 3
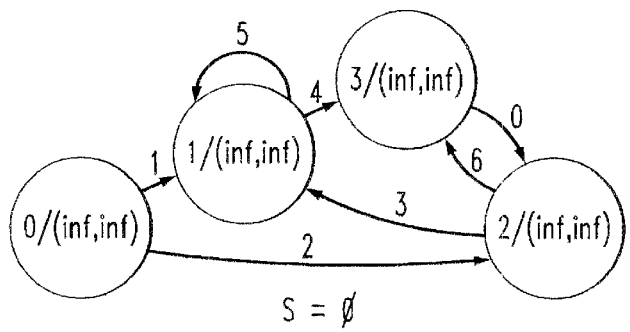
S = ∅
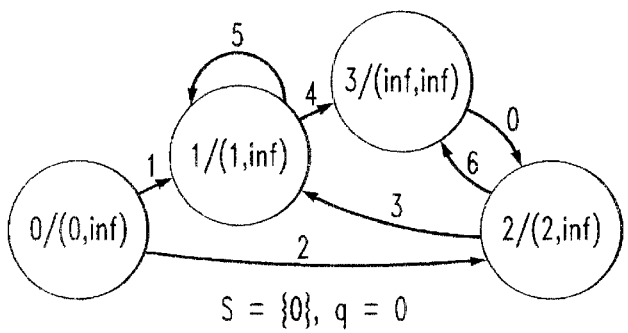
S = {0}, q = 0
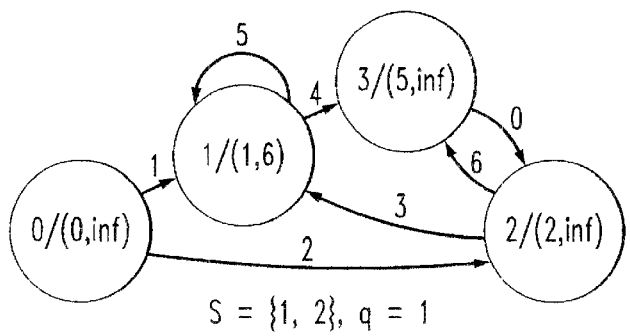
S = {1, 2}, q = 1
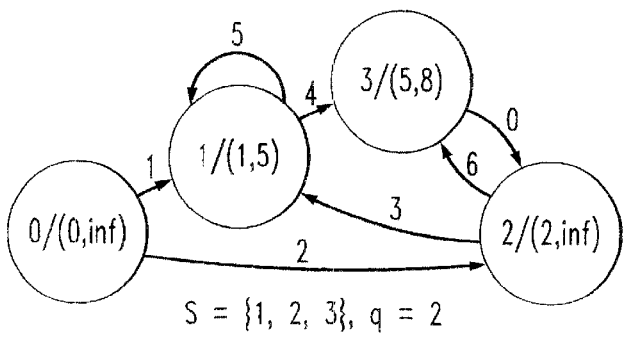
S = {1, 2, 3}, q = 2

FIG. 3 (cont.)
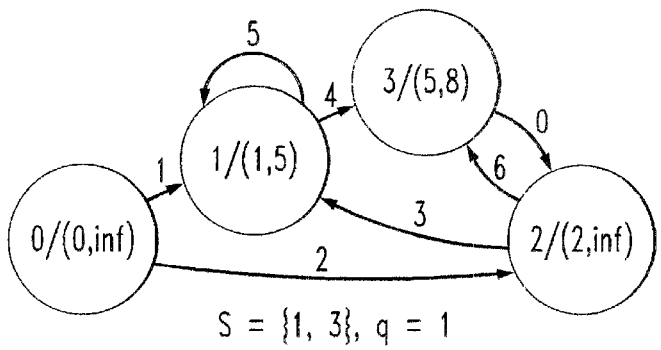
S = {1, 3}, q = 1
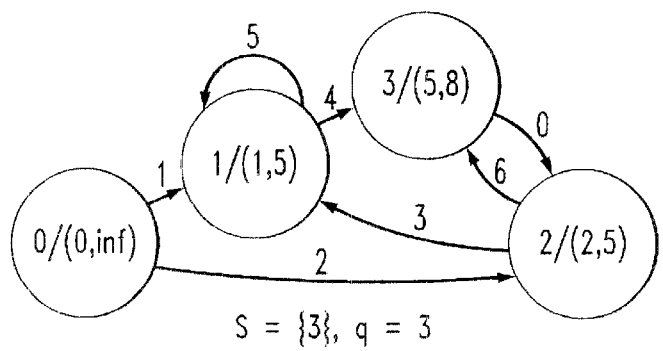
S = {3}, q = 3
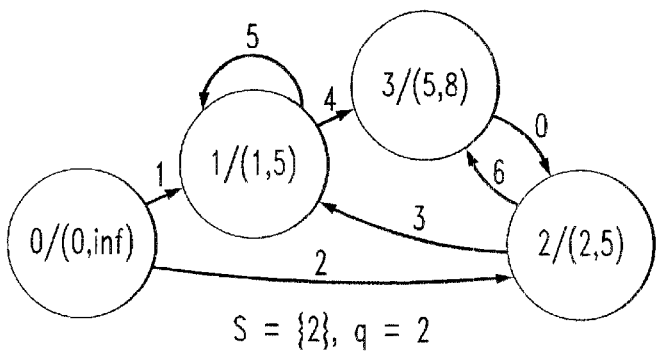
S = {2}, q = 2

```
APPROXIMATE-SINGLE-SOURCE-SHORTEST-DISTANCE (G, s, ε)
1  for i ← 1 to |Q|
2      do d[i] ← r[i] ← 0̄
3  d[s] ← r[s] ← 1̄
4  S ← {s}
5  while S ≠ ∅
6      do q ← head(S)
7          DEQUEUE(S)
8          r ← r[q]
9          r[q] ← 0̄
10         for each e ∈ E[q]
11             do if d[n[e]] ≠_ε d[n[e]] ⊕ (r ⊗ w[e])
12                 then d[n[e]] ← d[n[e]] ⊕ (r ⊗ w[e])
13                     r[n[e]] ← r[n[e]] ⊕ (r ⊗ w[e])
14                     if n[e]] ∉ S
15                         then ENQUEUE(S, n[e])
16 d[s] ← 1̄
```

SYSTEM AND METHODS FOR OPTIMIZING NETWORKS OF WEIGHTED UNWEIGHTED DIRECTED GRAPHS

BACKGROUND OF THE INVENTION

1. Field of Invention

This invention is related to systems and methods for analyzing and manipulating weighted or unweighted finite state automata, such as those usable in continuous speech automatic speech recognition systems and methods.

2. Description of Related Art

Flexible and robust automated speech recognition systems have long been sought. Automatic speech recognition can be viewed as a processing pipeline or cascade. In each step of the processing cascade, an output string of data from an upstream processing element is input into a current processing element. The processing element of each step uses a directed graph, such as a finite state automaton or a finite state machine, to convert the input data string into an output data string. At each processing element, each portion of the input data string generates one or more possible paths, or hypotheses, through that processing element. The data portions can represent acoustic information, phonemes, words, text strings or the like, depending on the processing element.

In automatic speech recognition, the term "lattice" denotes an acyclic directed and labeled graph, which is usually weighted. In each lattice, there is typically a designated start, or initial, node and one or more final nodes. Each possible path through the lattice from the initial node to a final node induces a hypothesis based on the arc labels extending between each pair of nodes in the path. For example, in a word lattice, the arc labels are words and the various paths between the initial node and the final node form word strings, such as sentences.

Speech recognition systems have progressed from simple, isolated word tasks that recognize only a few words, to dictation systems that are capable of recognizing continuous speech, to systems for directory information retrieval. Continuous speech recognition systems often have active vocabularies of over 500,000 words. Directory information retrieval systems often need vocabularies having millions of words.

To support these larger applications, conventional speech recognition systems use weighted finite state transducers to represent the valid set of word strings, such as sentences, that can be accurately recognized. The weights of the weighted finite state transducers are typically determined from a statistical model. This statistical model is based on statistically analyzing a large corpus of text data.

In practice, conventional speech recognition systems use an acoustic weighted finite state transducer to convert spoken utterances into sequences of phonemes and at least a grammar weighted finite state transducer to convert the sequences of phonemes into recognized word strings, such as sentences. The weights of at least the grammar weighted finite state transducer are combined with the weights produced by the acoustic finite weighted state transducer to determine the probability of each recognition hypothesis for a given utterance. The combined weights are then used to prune out the less-likely hypotheses during a Viterbi beam search or the like. Accordingly, it is essential to accurately determine the weights on the acoustic and grammar finite state transducers if the speech recognition system is to viably handle the large-vocabulary speech recognition tasks outlined above.

If the large-vocabulary speech recognition task to be performed by the speech recognition system does not have an available training corpus, at least the grammar weighted finite state transducer might be left unweighted. This occurs, because, as outlined above, the weights on the weighted finite state transducers are determined statistically from the training corpus. However, it should be appreciated that, while an unweighted finite state transducer can be used, the speed and accuracy of the speech recognition system may be considerably reduced.

Classical shortest-paths problems in a weighted directed graph arise in various contexts. The problems divide into two related categories: single-source shortest-path problems and all-pairs shortest-path problems. Determining the single-source shortest-path problem in a weighted directed graph comprises determining the shortest path from a fixed source node "s" of the nodes of the weighted directed graph to all other nodes of the weighted directed graph. Determining the all-pairs shortest-path is more general than finding the single-source shortest-path, and comprises finding the shortest path or paths between all pairs of nodes of the weighted directed graph.

In the classical shortest-path problem, the weights on the transitions between the nodes of the weighted directed graph represent distances, costs, or any other real-value quantity that can be added along a path and that one wishes to minimize. These classical shortest-path problems can be generalized to use other types of transition weights and to use other mathematical operations. In particular, the weights and operations can be any type of weight and any type of operation that can be defined using semirings.

Semirings define an algebraic structure, as set forth in "Finite-State Transducers in Language and Speech Processing", Mehryar Mohri, Computational Linguistics, 23:2, 1997 and in "Semirings, Automata, Languages", W. Kuich et al., *Monographs in Theoretical Computer Science*, Vol. 5, Springer-Verlag, Berlin, 1986, each incorporated herein by reference in its entirety. As defined in Kuich, semirings combine a "multiplication" operation, symbolized as "⊗" and an "addition" operation, symbolized using "⊕".

Classically, the transition weights are real numbers and the specific operations used to determine the shortest path include the addition and minimum operations. In particular, the transition weights are added along a path using the addition operation as the ⊗ operation. Once all the path weights are determined by addition, the minimum operation is applied as the ⊕ operation to select the path having the minimum weight.

Thus, the transition weights of the directed set are elements of an arbitrary set K, which may be the set of real numbers, a set of strings, a set of regular expressions, subsets of another set, or any other quantity that can be multiplied along a path using the "⊗" operation, and that can be "summed" using the "⊕" operation. That is, the weight of a path is obtained by "multiplying" the transition weights along that path using the "⊗" operator. Then, the shortest distance from a source node "s" to an end, or final, node "f" is the "sum" of the weights of all paths from the source node "s" to the ended node "f" using the "⊕" operator.

SUMMARY OF THE INVENTION

Within the generalized definition of the shortest distances set forth above, the systems and methods according to this invention determine the shortest distances between a source node "s" and an end node "f" of a weighted directed graph, such as a weighted finite state automaton.

As indicated above, unweighted finite state automata may be used in conventional speech recognition systems. However, such unweighted finite state automata generally considerably reduce the speed and accuracy of the speech recognition system. Unfortunately, developing a suitable training corpus for a speech recognition task that accurately reflects the a priori probabilities of different word and/or phoneme combinations is time consuming and expensive, if it is even possible.

For example, the training corpus for a directory information retrieval speech recognition system, given the huge numbers of given names and surnames used in the United States, and the potential variations in spelling and pronunciation, suggests that a training corpus for this speech recognition task would be prohibitively expensive and time consuming to compile.

Additionally, it is highly unlikely that any such training corpus could adequately reflect the various probabilities for the word and/or phoneme combinations. This occurs because the directory information speech recognition task is equally likely to have to recognize speech corresponding to any residential entry in the directory information database as any other residential entry. Similarly, because the speech recognition task is likely to have only the given name, surname, and city, and possibly the address, the directory information speech recognition task is likely to have insufficient context information.

Accordingly, such very-large-vocabulary speech recognition systems often must be used in an unweighted state.

This invention provides systems and methods for assigning weights to the transitions of unweighted directed graphs.

This invention further provides systems and methods for assigning weights to the transitions of unweighted directed graphs where the weighting information is derived solely from the unweighted directed graph itself.

The systems and methods of this invention accurately determine the transition weights for acyclic speech recognition systems, thus providing sufficient pruning information necessary for beam search algorithms.

This invention separately provides systems and methods for pushing weights through an arbitrarily weighted directed graph.

This invention further provides systems and methods for generalizing classical shortest-paths algorithms to other algebras.

This invention separately provides systems and methods that are able to determine the single-source shortest distances for an arbitrarily weighted directed graph.

This invention separately provides systems and methods that are able to approximately determine the single-source shortest distances for a weighted directed graph.

This invention additionally provides systems and methods for determining the single-source shortest distances in a weighted directed acyclic graph.

This invention separately provides system and methods having reduced complexity for determining the single-source shortest distances.

This invention separately provides systems and methods for determining the all-pairs shortest distances for an arbitrarily weighted directed graph.

This invention separately provides systems and methods that are able to reweight a weighted directed graph based on the determined single-source shortest distances for that weighted directed graph.

In the systems and methods according to this invention, these systems and methods for determining the single-source and all-pairs shortest distances are generic, in that any semiring covered by the generic framework of the systems and methods of this invention will work. These systems and methods for determining the single-source and all-pairs shortest distances according to this invention are also generic in that the systems and methods according to this invention will determine the single-source shortest distances regardless of the queue discipline chosen to implement a particular exemplary embodiment of the systems and methods according to this invention. In particular, the classical algorithm of Ford et al. is a special case of the generic systems and methods of this invention.

In particular, the systems and methods according to this invention are usable with any right semiring. Accordingly, the classical algorithm described in Lawler is also a special case of the general systems and methods of this invention.

The systems and methods according to this invention also reweight the directed graph based on the determined shortest distances, so that the weights are, for example, front weighted. Accordingly, searches through the directed graph that are based on the total weights of the paths taken will be more efficient. The systems and methods according to this invention further arbitrarily weight an unweighted directed graph so that the shortest distance and reweighting systems and methods can be applied to that directed graph.

These and other features and advantages of this invention are described in or are apparent from the following detailed description of the exemplary embodiments of the automatic speech recognition systems and methods according to this invention.

BRIEF DESCRIPTION OF THE DRAWINGS

Various exemplary embodiments of this invention will be described in detail, with reference to the following figures, wherein:

FIG. 1 is a first exemplary embodiment of a pseudo code program implementing one exemplary embodiment of the systems and methods for determining single-source shortest distances according to this invention;

FIG. 2 is a second exemplary embodiment of a pseudo code program implementing another exemplary embodiment of the systems and methods for determining the single-source shortest distances according to this invention;

FIG. 3 illustrates the operation of the first exemplary embodiment of the systems and methods shown in FIG. 1 where the two-shortest distances are determined;

DETAILED DESCRIPTION OF PREFERRED EMBODIMENTS

Figures 4, 5:
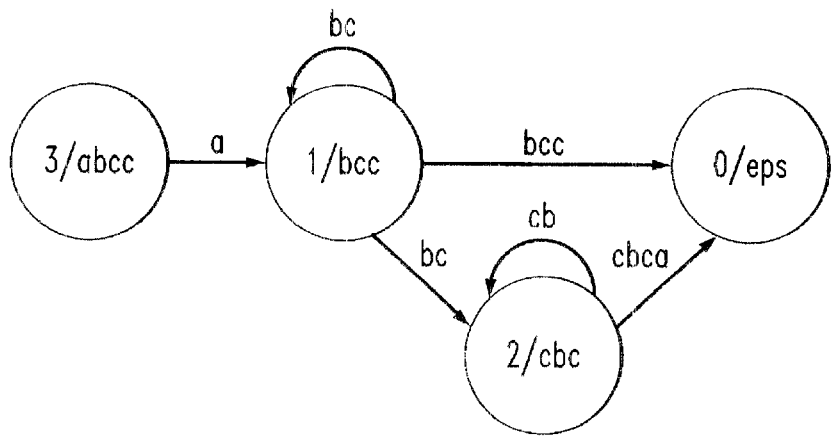
FIG. 4 is an exemplary embodiment of a string-to-string finite state transducer identifying the shortest string-distances from each node to the "0" node.
FIG. 5 is a third exemplary embodiment of a pseudo code program implementing a third exemplary embodiment of the systems and methods for determining approximate single-source shortest distances according to this invention.

The following detailed description of the various exemplary embodiments of this invention described herein will first provide a theoretical background for the invention, including definitions of the various terms used herein, such as "semiring". Once the theoretical underpinnings of the systems and methods according to this invention are discussed, the various exemplary embodiments of the systems and methods for weighting unweighted finite state automata and for pushing the weights through the weighted or arbitrarily weighted finite state automata are discussed.

The systems and methods of this invention are based on the algebraic structure of semirings. A right semiring is a system $(\mathbb{K}, \oplus, \otimes, \overline{0}, \overline{1})$ such that $\mathbb{K}, \oplus, \otimes, \overline{0})$ is a communitive monoid with $\overline{0}$ as the identity element of the set $\mathbb{K}$ for $\otimes$; $(\mathbb{K}, \otimes, \overline{1})$ is a monoid with $\overline{1}$ as the identity element of the set $\mathbb{K}$ for $\otimes$; $\otimes$ right distributes over $\oplus$, i.e., $(a \oplus b) \otimes c$ is equivalent to $(a \otimes c) \oplus (b \otimes c)$; and $\overline{0}$ is an annihilator for $\otimes$, i.e., $a \otimes \overline{0}$ is equivalent to $\overline{0} \otimes a$, and both are equivalent to $\overline{0}$. A left semiring is a system that is identical to a right semiring, except that $\otimes$ left distributes over $\oplus$. A semiring is a system that is both a right semiring and a left semiring. A semiring is "idempotent" if $a \oplus a = a$.

In particular, for the shortest distances to be well-defined, certain restrictions, such as the distributivity of the "$\otimes$" operation over the "$\oplus$" operation are required. Specifically, the algebraic structure that provides the appropriate framework for well-defining the shortest distances is the semiring structure. In particular, the notion of the "tshortest path" is no longer pertinent for the generalized definition of shortest distances as, for some semirings and some weighted graphs, the weighted directed graph may not contain a path between the source node "s" and the end node "f" that has a weight equal to the shortest distance from the source node "s" to the end node "f".

Conventionally, as disclosed in *The Design and Analysis of Computer Algorithms*, A. V. Aho et al., Addison-Wesley, Reading, Mass., 1974, it was believed that a unifying framework for single-source shortest path problems did not exist. Previously, specific single-source shortest path algorithms have been described in "Flows in Network", L. R. Ford et al., Technical Report, Princeton University Press, 1962; and *Combinatorial Optimization: Networks and Matroids*, E. L. Lawler, Holt, Rinehart and Winston, 1976. Similarly, specific all-pairs shortest distances algorithms and algebraic frameworks have been described in Aho, above; *Introduction to Algorithms*, T. Cormen, MIT Press, Cambridge, Mass., 1992; "Algorithm 97 (shortest path)", R. W. Floyd, Communications of the ACM, 18, 1968; and "A Theorem on Boolean Matrices", S. Warshall, Journal of the ACM, 9(1): 11–12, 1962.

The single-source shortest distances problem can be defined over a right semiring $(\mathbb{K}, \oplus, \otimes, \overline{0,1})$ and a weighted directed graph G, where $G=(Q, E, w)$ over $\mathbb{K}$, where:

Q is the set of nodes "q" of the weighted directed graph G;

E is the set of transitions, or edges, "e" between the nodes q of the weighted directed graph G; and w is the weight function that maps the transitions, or edges, e of the set of transitions, or edges, E to the elements $\mathbb{K}$ of this right semiring.

For any transition, or edge, e that is an element of the set of transitions, or edges, E, that edge e extends between an origin node and receiving node. The origin node for the transition e is "p[e]", while the receiving node for that transition e is "n[e]". For any node q that is an element of the set of nodes Q, the set of transitions E leaving that node q is "E[q]", while the set of transitions E entering that node q is "$E^R[q]$".

A path $\pi$ extending through the weighted directed graph G comprises a series of transitions "$e_1 e_2 \ldots e_k$" where $e_1 - e_k$ are each elements of the set of transitions E. The origin and receiving nodes $p[\pi]$ and $n[\pi]$ of the path $\pi$ are then $p[e_1]$ and $n[e_k]$, respectively. The weight function can also be extended to the path $\pi$ by "multiplying" together the weights of the transitions $e_1-e_k$ of the path $\pi$. Thus, the weight of the path $\pi$ is:

$$\omega[\pi] = \bigotimes_{i=1}^{k} w[e_i]$$

The set of paths from a source node "s" to a receiving node "d" is "P(q)". The classical single-source shortest path problem is defined by the Bellman-Ford equations as set forth in "On a routing problem", R. Bellman, Quarterly of Applied Mathematics, 16, 1958 and Ford et al., with real-valued weights and specific operations. In particular, in this classical single-source shortest path problem, the weights are added along the paths using addition of real numbers, i.e., the "+" operation. Then, the solution of the equation gives the shortest distance to each node q of the subset of nodes Q, i.e., the "min" operation.

In the systems and methods according to this invention, the single-source shortest path problem is generalized by considering an arbitrary right semiring $(\mathbb{K}, \oplus, \otimes, \overline{0,1})$. The weights of the elements of the set $\mathbb{K}$ are "multiplied" along the paths using the $\otimes$ operator. Then, the solution of the equations is the sum of the weights of the paths from the source node to each other node q of the set of nodes Q, i.e., the $\oplus$ operation.

In particular, "s", which is an element of the set of nodes Q, is a selected node of the weighted directed graph G, and is called the source. For any other node q of the set of nodes Q, the shortest distance from the source node "s" to any other node q is $\delta(s, q)$ and is associated to the weighted directed graph G. The shortest distance $\delta(s, q)$ is defined as:

$$\begin{cases} \forall q \in Q - \{s\}, & \delta(s, s) = \overline{1} \\ & \delta(s, q) = \bigoplus_{\pi \in P(q)} w[\pi]. \end{cases}$$

Accordingly, for a right semiring $\mathbb{K}$, a weighted directed graph G over $\mathbb{K}$, and a selected source node "s", the single-source shortest distance is the shortest distance $\delta(s, q)$ for each other node q that is an element of the set of nodes Q.

It should be appreciated, as indicated above, that the notion of the shortest path cannot, in general, be used, since, in some semirings, there might not be any path from the source node "s" to a receiving node "d" that that has the weight $\delta(s, q)$. Thus, the weight $\delta(s, q)$ is defined as the shortest distance, rather than the shortest path.

FIG. 1 is a first exemplary embodiment of a pseudo code program implementing the systems and methods for determining the single-source shortest distances for a selected source node "s" according to this invention. The systems and methods for determining the single-source shortest distances according to this invention are based on a generalization of the classical "relaxation" technique. It should be appreciated that a straightforward extension of this classical relaxation technique leads to an algorithm that does not work with non-idempotent semirings. To properly deal with the multiplicities in non-idempotent semirings, it is necessary to keep track of the changes to the tentative shortest distance from the source node "s" to a particular receiving node "d" after the last extraction of that node "d" from a queue S.

As shown in FIG. 1, the arrays d[i] and r[i] are initialized in steps 1–3. In particular, in step 1, i is set to point to a particular node in the set of nodes Q. In step 2, each element of the arrays d and r is set to the identity element for the ED operation. Then, in step 3, the array elements for the source node "s" are set to the identity element for the $\bigotimes$ operation.

The queue S is used to maintain the set of nodes whose departing edges are to be relaxed. Thus, in step 4, the queue S is initialized to the source node "s". Then, for each node q that is an element of the set of nodes Q, two attributes are maintained: 1) an estimate d[q] of the shortest distance from the source node "s" to the current node q; and 2) the total weight r[q] added to the shortest distance d[q] for the current node q since the last time the current node q was extracted from the queue S.

Then, step 5 defines a while loop that continues so long as the queue S is not empty. The while loop extends from step 6 through step 15. Each time through the while loop defined in steps 6–15, in steps 6 and 7, one of the nodes q in the queue S is extracted from the queue S. Next, in step 8, the value of r[q] for the extracted node q just after extraction is then stored in r. Then, in step 9, the value in r[q] is set to the identity element for the $\bigoplus$ operation.

Next, in step 10, for each transition extending from the current node q selected in the step 6, the departing edges of q are relaxed in steps 11–15. In step 11, the tentative shortest distance d[n[e]] for the receiving node n[e] for the current edge e leaving the current node q is checked to determine if it has been updated. If not, in steps 12 and 13, the tentative shortest distance d[n[e]] is updated during relaxation at the same time, the total weight r[n[e]] for the receiving node n[e] for the current transition e leaving the current node q is updated to keep track of the total weight added to the tentative shortest distance d[n[e]] since the receiving node n[e] of the current transition e leaving the current node q was either last extracted from the queue S, or since the time after initialization if the receiving node n[e] has not yet been extracted from these queue S. In particular, in steps 14 and 15, if the tentative shortest distance "d[n[e]]" is updated during the relaxation, and if the receiving node n[e] for the current transition "e" from the current node "q" is not already in the queue S, the node n[e] is added to the queue S, so that the departing edges from the node n[e] can be relaxed later.

The running time complexity of the first exemplary embodiment of the pseudo code program that implements the systems and methods for determining the single-source shortest distances, as shown in FIG. 1, hereinafter referred to as the generic single-source shortest distances method, depends on the semiring $\mathbb{K}$ and the particular implementations of the $\bigoplus$ operation and the $\bigotimes$ operation used in implementing the generic single-source shortest distances method. The computation time for the $\bigoplus$ operation is $T_\oplus$, while the computation time for the $\bigotimes$ operation is $T_\otimes$. The number of times each node q is inserted into the queue S when the generic single-source shortest distances method is run on the weighted directed graph G is n[q]. The worst cost for removing a node q from the queue S during steps 6 and 7 of the exemplary embodiment of the method shown in FIG. 1 is C(E), while the worst cost of inserting the node q back into the queue S is C(I). During a relaxation call in step 12, a tentative shortest distance may be updated. This may also affect the queue discipline. The worst cost of an assignment including the possible cost of reorganizing the queue to perform this assignment is C(A).

Thus, the initialization steps, steps 1–3, take O(|Q|) time. Each relaxation operation defined in steps 11–13 takes $O(T_\oplus + T_\otimes + C(A))$ time. There are exactly N(q) |E[q]| relaxations for each current node q. The total cost of the relaxations for the current node q is thus:

$$O((T_\oplus + T_\otimes + C(A))|E| \max_{q \in Q} N(q)).$$

As indicated above, the first exemplary embodiment of the generic single-source shortest distances method works with any queue discipline for the queue S. However, it should be appreciated that some queue disciplines are better than others. The appropriate choice of the queue discipline for the queue S depends on the particular semiring $\mathbb{K}$ and the specific restrictions imposed on the weighted directed graph G. In particular, some exemplary embodiments of the queue disciplines that could be selected for the queue S include "topological order", "shortest-first order", "first-in first-out (FIFO) order" and the like.

FIG. 2 is a secod exemplary embodiment of a pseudo code program implementing the systems and methods for determining the single-source shortest distances for a selected source node "s" according to this invention. In particular, FIG. 2 is an exemplary embodiment of the generic single-source shortest distances method shown in FIG. 1 for a topological queue discipline for the queue S. In particular, as shown in steps 1–3 of FIG. 2, the arrays "d" and "r" are initialized as in the generic single-source shortest distances method shown in FIG. 1. Then, in step 4, for each strongly connected component (SCC) of the weighted directed graph G, the strongly connected components "X" are selected in topological order. Next, in step 5, steps 6–18 are performed for each selected strongly connected component X. In particular, in step 6, the nodes q of the selected strongly connected component X are placed into the queue S and the total weight "r" for each such node q is set to the identity element for the $\bigotimes$ operator.

Then, steps 7–18 of FIG. 2, which are generally identical to steps 5–16 of FIG. 1, are performed. That is, in steps 7–9, while the queue S is not empty, a current node q is selected from the queue S. Then, in steps 10–18, the current node q is analyzed as in steps 9–16 of the single-source shortest distances method set forth in FIG. 1. However, in step 17, the receivingnode n[e] is added to the queue S only if receiving node n[e] for the current transition "e" from the current node "q" is not already in the queue S and the receiving node is not in the currently selected strongly connected component X. In step 7, once the queue S for the current strongly connected component is empty, in step 5, the next strongly connected component X of the weighted directed graph G is selected for analysis. This continues until all of the strongly connected components X of the weighted directed graph G have been selected and analyzed.

While the complexity of the generic topological-single-source shortest distances method is not significantly different from that of the generic single-source shortest distances method shown in FIG. 1, when the weighted directed graph G is acyclic, the complexity of the topological-single-source shortest distances method is linear. This occurs because each strongly connected component X in the weighted directed graph G is reduced to a single node q when the weighted directed graph G is acyclic. That is, because the weighted directed graph G is acyclic, the current node q cannot be reinserted into the queue S after relaxation of the transitions leaving the current node q. Thus, each node q is inserted into the queue S at most once. Thus, there will be exactly |E[q]| relaxation calls made in the generic topological-single-source shortest distances method for each call to the current node q. Moreover, it should be appreciated that the topological sort between the various strongly connected components X can be done in linear time. Additionally, the test in line 15 of the generic topological-single-source shortest distances method can be done in constant time, as a strongly connected component X is reduced to a single node q.

It should be appreciated that classical shortest distances algorithms, such as Dijkstra's algorithm and the Bellrnan-Ford algorithm, are also special cases of the above-outlined generic single-source shortest distances algorithm. These classical shortest distances algorithms appear when the semiring $(\mathbb{K}, \oplus, \otimes, \bar{0}, \bar{1})$ is the tropical semiring $\mathbb{T}=(\mathbb{R}_+\cup\{\infty\}, \min,+,\infty,0)$. The tropical semiring defines a semiring over the set of non-negative real numbers $\mathbb{R}_+$ plus the ∞ element.

In particular, Dijkstra's classical shortest-path method occurs when the tropical semiring is used as the semiring $\mathbb{K}$ and where the queue discipline is based on the "shortest-first" order. Similarly, the classical Bellman-Ford method is a special case where the tropical semiring is used as the semiring $\mathbb{K}$ and where the queue discipline is based on first-in first-out (FIFO) queue discipline.

Occasionally, it is necessary to determine not only the single shortest distance from a particular source node "s" to a particular receiving node "d" but to determine the k-shortest distances from that particular source node "s" to that particular receiving node "d". A variety of domains, ranging from network routing to speech recognition, often require finding not just the shortest path, but up to k shortest paths.

In this case, the generic single-source shortest distances method set forth above with respect to FIG. 1 can be converted into a generic single-source k-shortest distances method by defining a new queue discipline based on the shortest-first order described above. As indicated above, the number of times a particular node q is inserted into the queue S depends on the queue discipline chosen. Thus, the shortest-first queue discipline can be modified into an extended-shortest-first order. The extended-shortest-first order queue discipline on the queue S is defined by extracting a current node q before a next node q' if $d[q] \leq_\mu d[q']$ where the relation "$\leq_\mu$" is "$\mu(a) \leq \mu(b)$".

FIG. 3 illustrates the execution of the generic single-source k-shortest distances method for k=2. Each different representation of the weighted directed graph shown in FIG. 3 corresponds to a specific extraction from the queue S of a particular node q. The tentative shortest distance pairs are indicated for each node at each step of the execution of the generic single-source k-shortest distances method.

In some applications, such as speech recognition, where weighted automata are used, it may be necessary to determine the k-shortest paths to each state labeled with distinct strings. To determine these paths, the weighted determinization of automata described in Mohri can be used, followed by the single-source k-shortest distances method described above. In contrast, in many applications, such as routing problems, the user is only interested in determining the k-shortest distances or paths from the fixed source node s to a fixed receiving node "t". In this case, the efficiency of the method can be further improved by requiring each next node q' to have a path to the fixed receiving node "t".

FIG. 4 illustrates one exemplary embodiment of a string-to-string finite state automaton. In the string-to-string finite state automaton shown in FIG. 4, each of the nodes 1–3 have been labeled with the single-source shortest distance from that node to the 0 node. For example, the 3 node has been labeled with the single-source shortest distance "abcc", which corresponds to the transition from the 3 node to the 1 node, with weight "a", and from the 1 node to the 0 node, with weight "bcc". Similarly, the 1 node has a single-source shortest distance of "bcc", which is the weight from the 1 node to the 0 node. It should be appreciated that, even though the 1 node has a loop with weight "bc" that both enters and leaves the 1 node, this loop can be ignored, as following this transition will only increase the single-source distance from the 1 node to the 0 node above the single-source shortest distance "bcc". Likewise, the path from the 1 node to the 0 node through the 2 node can be ignored, as the weight on the transitions from the 1 node to the 2 node and from the 2 node to the 0 node is greater than the weight on the transition directly from the 1 node to the 0 node.

In many applications, when the weights on the transitions of the weighted directed graph are non-negative, the transitions of the weighted directed graph are labeled with the -log of the original weights, rather than the original weights themselves. For example, when the weights represent probabilities, such as in finite state automata used with speech recognition, the transitions of the finite state automata are weighted with the negative log of the probabilities. In this case, the probabilities represent the priorities developed by applying the training corpus to the various finite state automata. The negative log of the original weights is used in place of the original weights primarily because multiplying floating-point numbers has an inherent lack of precision. Thus, the semiring $(\mathbb{R}_+,+,*,0,1)$ is then replaced by the log semiring $\mathbb{L}=(\mathbb{R}\cup\{\infty\},\oplus_L,+,\infty,0)$. In particular, the log addition operator "$\oplus_L$" is defined such that $a \oplus_L b = -\log(\exp(-a)+\exp(-b))$. Furthermore, by convention, "$\exp(-\infty)$" is defined as 0, while "$-\log(0)$" is defined as ∞.

Moreover, it should be appreciated that the generic approximate single-source shortest distances outlined above can be similarly used with the log semiring. In this case, the addition operator ⊕ is replaced by the log addition operator ⊕$_L$ and the multiplication operator ⊗ is replaced by the operator +. More generally, the approximate generic single-source shortest distances method described above can be used with the log semiring by appropriately defining the approximation factor ε.

The single-source shortest distances, over the log semiring $\mathbb{T}$, must be determined in a variety of different applications where statistical models are used. The weights labeling the edges or transitions of the graphs are often interpreted as probabilities in such statistical models. The single-source shortest distances methods described above can be used, for instance, to determine the entropy of a model for text compression, or to support several important optimizations used in speech recognition. One such important optimization that uses single-source shortest distances over the log semiring is the new weight pushing method according to this invention that is described below. This weight pushing method leads to a substantial improvement in the performance of very-large-vocabulary speech recognition systems and any other weighted directed graphs that have a very large number of nodes and that use the log semiring $\mathbb{L}$.

Previously, the only available algorithm for determining exactly the single-source shortest distances in the log semiring $\mathbb{L}$ was the conventional generic all-pairs shortest distances algorithm. However, the size of the graphs encountered in these very-large-vocabulary speech recognition systems and other directed-graph-based systems, such as routing systems and the like, often have 100,000–25,000,000 states/transitions. Thus, it is impossible to use the conventional generic all-pairs shortest distances method to determine the exact single-source shortest distances. This method is impossible to use for a number of reasons. First, the memory space requirement for such large numbers of states and/or transitions means that these very large graphs cannot be stored in any reasonable sized memory, if at all. Additionally, the generic all-pairs shortest distances method has a complexity that is cubic in time. Thus, even if all of the states and transitions could be stored in a reasonable sized memory, the single-source shortest distances could not be determined in anything approximating real time, if at all.

However, for most of these uses of the generic single-source shortest distances method according to this invention described above, a good approximation of the shortest distances often suffices. This occurs because the initial weights themselves assigned to the various transitions of the very large weighted directed graphs were themselves generally obtained based on one or more approximations.

FIG. 5 is a first exemplary embodiment of a pseudo code program implementing approximate-single-source shortest distances methods and systems of this invention for approximately solving the single-source shortest distances problem according to this invention. The approximate single-source shortest distances method shown in FIG. 5 differs only from the generic single-source shortest distances exemplary pseudo code shown in FIG. 1 by the approximate equality test "=$_\epsilon$". That is, in step 11 of FIG. 5, rather than steps 12 and 13 being performed whenever the tentative shortest distance "d[n[e]]" is not exactly equal to d[n[e]]((r⊗w[e]), as in step 11 of FIG. 1, the tentative shortest distance "d[n[e]]" will be updated only if the tentative shortest distance d[n[e]] differs from d[n[e]]((r⊗w[e]) by more than the approximation factor ε. In the same way, an approximate topological single-source shortest distances method can be defined by replacing the standard equalities "=" in the method outlined in FIG. 3 with approximate equalities "=$_\epsilon$", as outlined above.

The inventor of this application has reduced to practice the approximate topological single-source shortest distances method described above, and has successfully applied it to determine the single-source shortest distances within finite state automata of more than 100,000 states and/or transitions used in speech recognition. This exemplary reduction to practice used an approximation factor ε of 0.001.

In particular, the generic all-pairs shortest distances methods could not be used with these speech recognition finite state automata. The results obtained by applying the approximate topological single-source shortest distances method were compared to the results obtained from applying the generic all-pairs shortest distances methods to small weighted directed graphs. It should be appreciated that, even when using floating-point numbers, approximations are necessary even in the case of the generic all-pairs shortest distances determinations.

The shortest distances found by applying the approximate topological single-source shortest distances and the generic all-pairs shortest distances methods to these small weighted directed graphs were not significantly different from each other for applications such as speech recognition.

Using a Silicon Graphics Origin 2000™ workstation, it took about one minute to determine the shortest distances for a finite state automaton having about 230,000 nodes, 460,000 transitions and about 210,000 strongly connected components using the approximate single-source shortest distances algorithm with either a shortest-first queue discipline or a first-in first-out order queue discipline.

Figure 6:
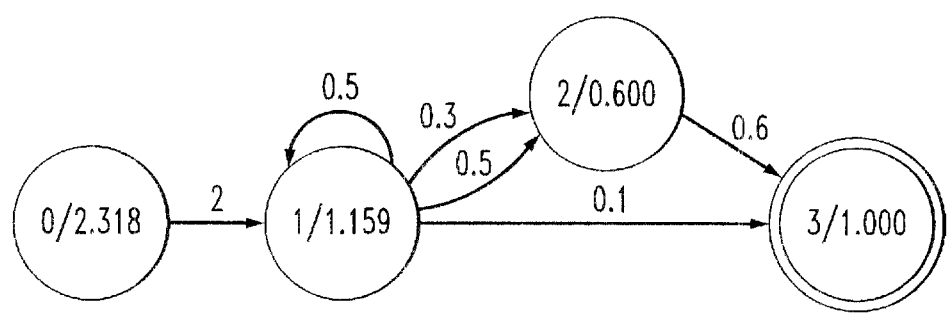
FIG. 6 is an exemplary finite state transducer with the approximate shortest distances to the "3" node in the real semiring R with ϵ equal to 0.001.

FIG. 6 is an exemplary embodiment of a weighted finite state automaton weighted over the real semiring $\mathbb{R}$. The approximate shortest distances to the 3 node determined by applying the approximate single-source shortest distances method according to this invention for each other of the 0 node, 1 node and 2 node of the weighted finite state automaton is indicated in each of these nodes. In particular, the approximate single-source shortest distances method used an approximation factor ε of 0.001. By comparison, the value of the shortest distance from the 1 node to the 3 node given with real-number precision is (1/(1−0.5))*((0.3+0.5)*0.6+0.1)=1.16.

Figure 7:
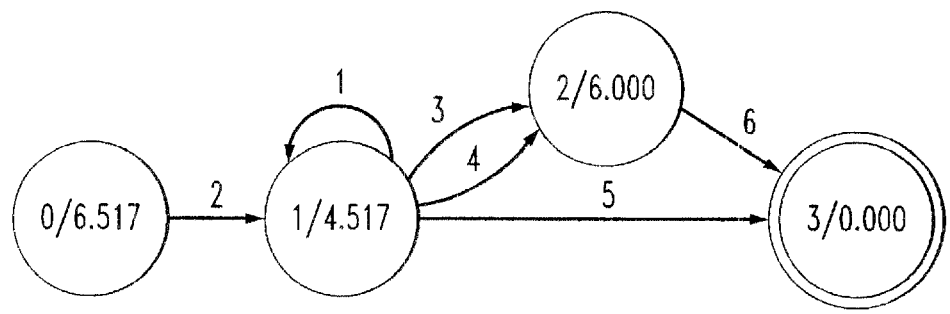
FIG. 7 is a finite state transducer labeled with the approximate shortest distances to the "3" node in the log semiring L with ϵ equal to 0.00 1.

FIG. 7 is an exemplary embodiment of a weighted directed graph that is weighted over the log semiring $\mathbb{L}$. The approximate shortest distances to the 3 node is indicated in each of the 0–2 nodes. The approximate shortest distances indicated in each of the 0–2 nodes was determined using the approximate single-source shortest distances method outlined above. In this case, the approximation factor ε of 0.001 was used. As shown in FIG. 7, the approximate shortest distance for the 1 node to the 3 node is 4.517. In comparison, the real-number value of the shortest distance from the 1 node to the 3 node is:

−log(exp(−(3+6))+exp(−(4+6))+exp(−5))−log(1−exp(1))≈4.51657996.

The various exemplary embodiments of the single-source shortest distances methods and systems according to this invention outlined above can be used to define weight pushing systems and methods that can dramatically improve the performance of speech recognition systems and other systems that use weighted directed graphs. As outlined above, the transitions of a weighted directed graph are weighted over some arbitrary semiring $\mathbb{K}$. In the exemplary embodiments of the single-source shortest distances systems and methods outlined above, the single-source shortest distances are defined from a given node to each other node in the weighted directed graph. Similarly, the shortest distances δ(F,q) from a set of nodes F to each node q is defined over a weighted directed graph G. If a new node s' is introduced, and that new node s' is connected to each node of the set of nodes F by a transition weighted with the identity value $\bar{1}$ for the multiplication operator $\otimes$, then δ(F,q)=δ(s',q). Therefore, determining the shortest distances from a set of nodes F to each node q can be reduced to determining a single source shortest distances method with source node s'. For example, in speech recognition, for the pushing method according to this invention, the weights at each node are the shortest distances from the final nodes to that node.

Then, the original weights can be pushed forward from the final nodes towards the source, such as the 0 node, as much as possible. Of course, it should be appreciated that the original weights can be pushed backward by considering the transposed weighted directed graph $G^T$ of the original weighted directed graph G, where the directions of the transitions are reversed. In speech recognition, the weights are pushed towards the initial state.

Figure 8:
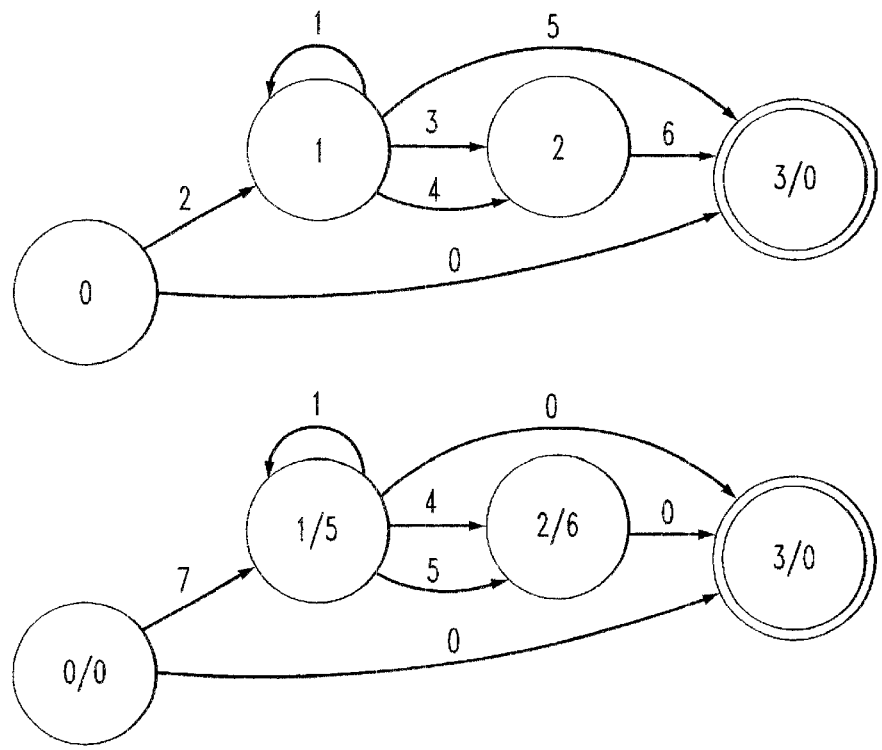
FIG. 8 shows an exemplary finite state transducer showing the weights on the transitions before and after weight pushing according to this invention in the tropical semiring $\mathbb{T}$, labeled with the shortest distances to the "3" node.
Figure 9:
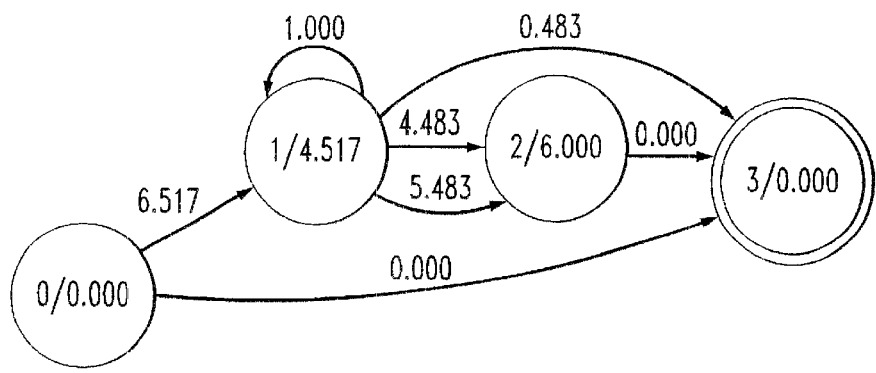
FIG. 9 shows an exemplary finite state transducer showing the weights on the transitions before and after weight pushing according to this invention in the log semiring $\mathbb{L}$, labeled with the shortest distances to the "3" node.

In order to best illustrate the pushing method of this invention, FIG. 8 shows pushing of the weights through the more-familiar tropical semiring T. FIG. 9 then illustrates pushing of the weights using the pushing method of this invention through the log semiring L.

FIG. 8 illustrates the application of the weight pushing systems and methods of this invention to an exemplary weighted directed graph G that is weighted over the tropical semiring T. The top portion of FIG. 8 shows the original weighted directed graph G, while the bottom portion of FIG. 8 shows the resulting weighted directed graph G' after the weights are pushed forward towards the source node, which is the 0 node in the pushed weighted directed graph G'.

In particular, the weight of 6 on the transition between the 2 node and the 3 node is pushed back into the 2 node, and the weight of 6 on that transition is reset to 0. Similarly, the weight of 5 on the transition from the 1 node to the 3 is pushed back into the 1 node and the weight of 5 on that transition is also reset to 0. Similarly, the transition from the 0 node directly to the 3 node has a weight of 0. Thus, the 0 node is rewritten to reflect this zero weight. Because the weight is already zero, there is no need to reset the weight on the transition between the 0 node and the 3 node.

Then, the intermediate transitions are reweighted to reflect the weights pushed onto the 0, 1 and 2 nodes. For example, there are two transitions from the 1 node to the 2 node, having weights of 3 and 4, respectively. These transitions are reweighted with weights of 4 and 5, respectively, as described below. As shown in the top graph of FIG. 8, there are two paths from the 1 node to the 3 node through the 2 node, having total weights of 3+6=9 and 4+6=10, respectively.

For a weighted directed graph G, when weighted over the tropical semiring T, as when weighted over the log semiring L the transitions along the weighted directed graph G are added. Thus, as indicated above, a transition having a weight w and extending between a source node q and a receiving node q' is reweighted as:

$$w' = w + p_{q'} - p_q;$$

where:

w is the weight of transition before weight pushing;

w' is the weight on the transition after pushing the weight on that transition forward;

$p_{q'}$ is the weight previously pushed onto the receiving node q'; and $p_q$ is the weight pushed onto the source node.

Thus, for the tropical semiring T shown in FIG. 8, the weights on the two transitions between the 1 node and the 2 node are 3+6−5=4 and 4+6−5=5, Similarly, the transition from the 0 node to the 1 node is reweighted from a weight of 2 to a weight of 7=2+5−0. Finally, the transition looping over the 1 node does not have its weight changed, as, in this case, the weight on the receiving node q and the source node q' is the same.

Importantly, the total weight on any one of the paths through the pushed weighted directed graph G' does not change relative to the original weighted directed graph G. Rather, only the amount of weight applied by any particular transition is changed, to front-load the weights as much as possible. Thus, in the original weighted directed graph G, there is one path directly from the 0 node to the 3 node, having weight 0, one path from the 0 node through only the 1 node to the 3 node, having weight 7, and two paths from the 0 node through the 1 and 2 nodes to the 3 node, having weights 11 and 12, respectively. Additionally, there are an infinite number of paths from the 0 node to the 3 node that pass through the 1 node two or more times. Each one of these paths will have a weight that is one greater than the path having one or fewer transitions through the 1 node.

Similarly, in the pushed weighted directed graph G', the transition from the 0 node directly to the 3 node also has a weight of 0, the path from the 0 node directly through the 1 node to the 3 node has a weight of 7, and the two paths from the 0 node through the 1 and 2 nodes to the 3 node have weights of 11 and 12, respectively.

The weighted directed graphs G and G' shown in FIG. 8 are weighted over the tropical semiring T. Thus, to determine the shortest distances in these weighted directed graphs G and G', the sum of the weights along the paths from a particular source node to a particular receiving node are determined, and the minimum path weight of all of the paths from the particular source node to the particular receiving node is taken as the single-source shortest distance. In contrast, if the weighted directed graphs G and G' shown in FIG. 8 had been weighted over the probability semiring, the weights along the paths would be multiplied together. Then, the shortest distance over that path would be obtained by adding together all the probabilities for the various different paths from the particular source node to the particular receiving node.

FIG. 9 illustrates the application of the weight pushing systems and methods of this invention to an exemplary weighted directed graph G that is weighted over the log semiring L. In particular, the directed graph shown in FIG. 9 generally corresponding to the approximately weighed directed graph shown in FIG. 7, except that this weighted directed graph includes an additional, zero-weighted transistion between the 0 node and the 3 node relative to the directed graph shown in FIG. 7. The directed graph shown in FIG. 9 results from pushing the weights forward towards the source node, which is the 0 node in the pushed weighted directed graph.

In particular, for a weighted directed graph that is weighted over the log semiring L, each transition between a particular source node and a particular receiving node is reweighted as:

$$w' = w + p_{q'} - p_q.$$

In contrast, for a probability semiring, the new transition weight w' is:

$$w' = w * p_{q'}/p_q.$$

It should be appreciated that those of ordinary skill in the art will readily understand how to reweight the various transitions within a weighted directed graph based on the particular semiring over which that weighted directed graph has been weighted.

More generally, the weights are pushed through the weighted directed graph by first determining the shortest distances δ(q,F) from each node q to the set of nodes F using one of the exemplary embodiments of the generic single-source shortest distances methods outlined above. In particular, the generic single-source shortest distances method should be used when possible. Then, once all of the shortest distances δ(q,F) are determined, the weights w of the various transitions of the weighted directed graph g are replaced by the pushed weights w' as:

if $w[e] \otimes \delta(n[e], F) \neq \overline{0}$, then $\forall e \in E, w'[e] = [\delta(p[e], F)]^{-1} \otimes (w[e] \otimes \delta(n[e], F))$;

otherwise, $w'[e] = \overline{0}$.

By definition of the shortest distances:

$$\delta(p[e], F) = \bigoplus_{\pi \in P(p[e], F)} w[e]$$

$$\delta(n[e], F) = \bigoplus_{\pi \in P(n[e], F)} w[e]$$

It should be appreciated that the weight pushing algorithm operates only when the weighted directed graph has weights associated with the various transitions. As discussed above, for very large vocabulary tasks, such as continuous speech recognition tasks, directory information speech recognition tasks or routing tasks over extremely large networks, it is extremely difficult, if it is even possible, to weight the transitions of such weighted directed graphs using a training corpus or the like. Thus, such large weighted directed graphs are often left unweighted.

However, it should be appreciated that such graphs can be weighted according to their structures. That is, for such unweighted graphs, one measure of the shortest distances of the paths in such unweighted directed graphs is the number of actual transitions taken between a particular source node and a particular receiving node. Moreover, an unweighted directed graph can be viewed as a weighted directed graph where every transition, rather than having no weight, is provided with the same weight. In particular, an appropriate weight for each transition, for any arbitrarily weighted directed graph and over any arbitrary semiring, is a value of $\overline{1}$, i.e., the identity value of the multiplication operator for the specific semiring used to weight the weighted directed graph. In general, any arbitrary value can be used except the identity value of the addition operator of the specific semiring used to weight the weighted directed graph. Thus, the distances of the paths become directly related to the number of transitions within each path.

It should also be appreciated that rather than merely weighting each transition of the arbitrarily weighted directed graph with the same arbitrary value, the arbitrary weight can be normalized over the arbitrarily weighted directed graph. The following example assumes the arbitrary value is 1.

Thus, for example, if the number of transitions in the weighted directed graph is n, and the base arbitrary weight to be applied to each transition of the arbitrary graph is b, then the actual arbitrary weight assigned to each transition a is:

$$a = (b/n).$$

As a result, the distance of each path through the weighted directed graph is based on not only the number of transitions in each such path, but the overall number of transitions within the weighted directed graph. Of course, it should be appreciated that, rather than merely normalizing the base arbitrary weight b based on the number of transitions n, more complicated functions of the structure of the weighted directed graph could be used, such as the number of paths, the number of nodes, the number of transitions between a particular pair of nodes, or any other known or later developed value that represents an aspect of the structure of the weighted directed graph. Thus, it is possible to determine the single-source and all-pairs shortest distances based solely on the information, such as, for example, the number of transition or the number of paths, inherent within the arbitrarily weighted directed graph itself.

Once the large weighted directed graph has been arbitrarily weighted in this way, the various exemplary embodiments of the single-source shortest distances methods and the all-pairs shortest distances methods described above, as well as the weight pushing method described above, can be applied to such an arbitrarily weighted directed graph. In this case, the pushed weights and the single-source shortest distances will directly reflect, for example, the number of transitions in each of the paths between the source node and the receiving node, or any other aspect of the structure of the arbitrarily weighted directed graph represented by the normalizing value n.

Figure 10:
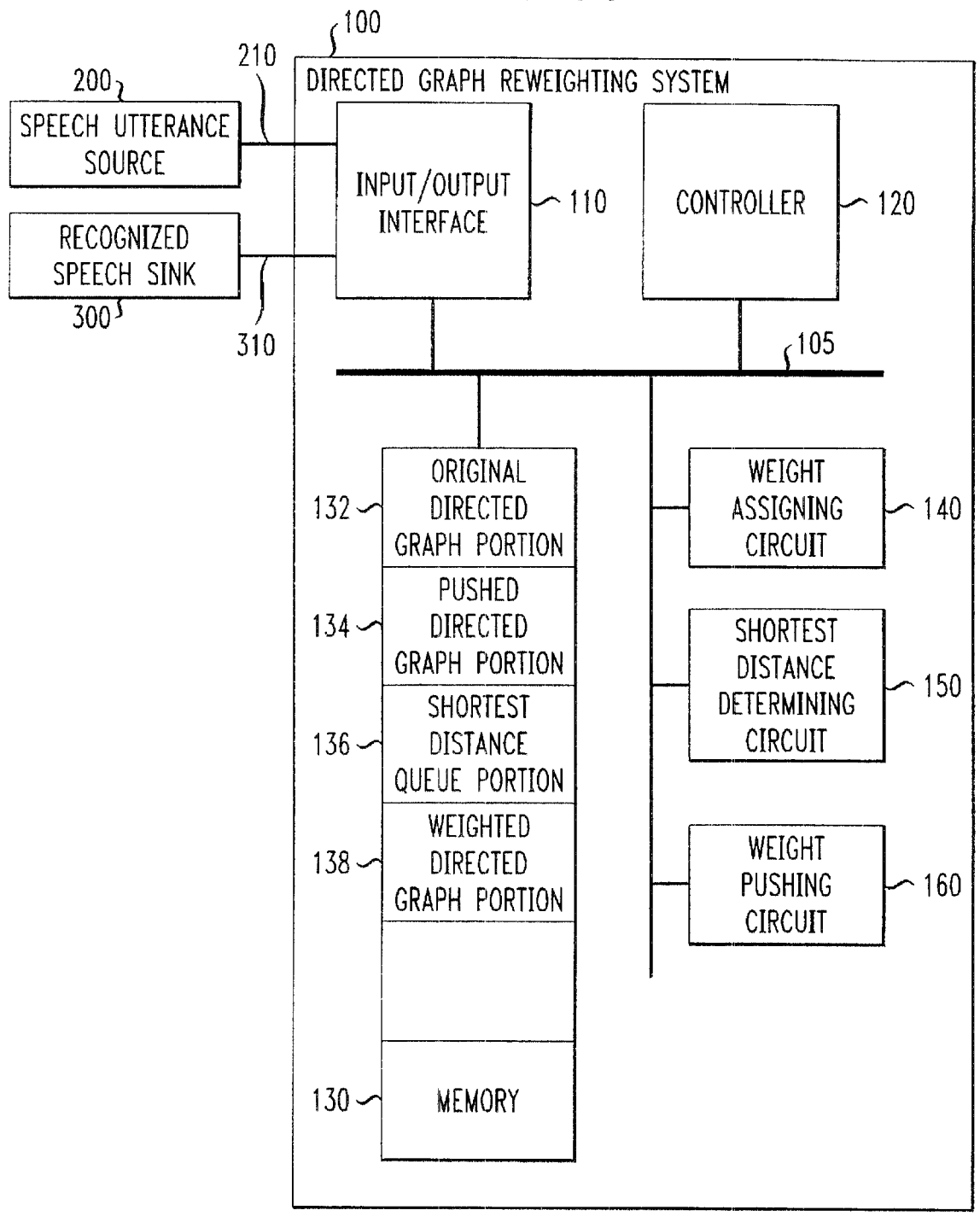
FIG. 10 is a functional block diagram of a first exemplary embodiment of directed graph reweighting system according to this invention.

FIG. 10 is a block diagram showing one exemplary embodiment of a directed graph reweighting system 100 according to this invention. As shown in FIG. 10, the directed graph reweighting system 100 includes an input/output interface 110, a controller 120, a memory 130, a weight assigning circuit 140, a shortest distances determining circuit 150, and a weight pushing circuit 160, each interconnected by a data/control bus 105.

As shown in FIG. 10, the memory 130 includes an original directed graph portion 132 that stores an original directed graph comprising a plurality of nodes and a plurality of transitions connecting the nodes. The memory 130 also includes a pushed directed graph portion 134 that stores a weighted directed graph that has had the weights pushed through it by the weight pushing circuit 160. Like the original directed graph portion 132, the weighted directed graphs stored in the pushed directed graph portion 134 comprises a plurality of nodes interconnected by a plurality of transitions. The memory 130 further includes a shortest distances queue portion 136 that stores the queue and other data used by the shortest distances determining circuit 150 and the shortest distances determined by the shortest distances determining circuit 150. Finally, the memory 130 can optionally include a weighted directed graph portion 138 that stores a weighted directed graph that has had weights assigned by the weight assigning circuit 140.

The controller 120 controls each of the weight assigning circuit 140, the shortest distances determining circuit 150, and the weight pushing circuit 160, as well as the input/output interface 110. In particular, the controller 120, when the input/output interface 110 of the directed graph reweighting system 100 receives a new unweighted or weighted directed graph, stores that new unweighted or weighted directed graph in the original directed graph portion 132 of the memory 130. The controller 120 will also determine if that original unweighted or weighted directed graph includes weights on its transitions, or if the original unweighted or weighted directed graph stored in the original directed graph portion 132 is an unweighted directed graph.

If the controller 120 determines that the original unweighted or weighted directed graph stored in the original directed graph portion 132 is an unweighted directed graph, the controller 120 will activate the weight assigning circuit 140. The weight assigning circuit 140 will input the original unweighted directed graph stored in the original directed graph portion 132 and assign weights to each of the transitions of the unweighted directed graph. As indicated above, the weight assigning circuit 140 could simply assign a predetermined weight to each of the transitions. In particular, this particular weight can be selected based on the particular semiring over which the shortest distances determining circuit 150 will determine the shortest distances.

Alternatively, the weighted assigning circuit 140 can assign the weight in a more sophisticated manner, such as those indicated above, that more fully capture one or more aspects of the structure of the original unweighted directed graph stored in the original directed graph portion 132. These more sophisticated techniques can include normalizing the base weight over the number of transitions in the original unweighted directed graph, normalizing the base weight assigned to each of a set of transitions between two selected nodes based on the number of those transitions between those nodes, or normalizing the weights using any other known or later developed technique that reflects one or more aspects of the structure and/or organization of the original unweighted directed graph. The weight assigning circuit 140 then stores the weighted original directed graph either back into the original directed graph portion 132 or a weighted directed graph portion 138 of the memory 130.

Once the original directed graph portion 132 or the weighted directed graph portion 138 contains a weighted directed graph, the shortest distances determining circuit 150 determines at least one shortest path through that weighted directed graph. In various exemplary embodiments, the shortest distances determining circuit 150 determines the shortest distances from either a receiving node or a source node to each other node of the weighted directed graph, depending on whether the weights are to be pushed through the weighted directed graph backwards towards an initial node or forward towards a stop node, respectively.

In particular, the shortest distances determining circuit 150 operates as discussed above with respect to FIGS. 1, 2 and 4–7, as appropriate based on the particular semiring over which the shortest distances through the weighted directed graph are to be determined. The shortest distances determining circuit 150 associates a shortest path distance from either the receiving node or the source node to each other node and embeds the corresponding shortest distances from each node to either the source node or the receiving node into that other node.

In particular, as outlined above, the shortest distances determining circuit 150, under control of the controller 120, enqueues or dequeues various ones of the nodes of the weighted directed graph into a queue stored in the shortest distances queue portion 136. Additionally, the shortest distances determining circuit 150, under the control of the controller 120, initializes the shortest distances estimate array d and the total weight array r in the shortest distances queue portion 136. Once the shortest distances determining circuit 150 has determined the shortest distances for each other node of the weighted directed graph to either the source node or the receiving node, the shortest distances determining circuit 150, under control of the controller 120, modifies the weighted directed graph stored in either the weighted directed graph portion 138 or the original directed graph portion 132 so that each other node reflects the shortest distance of that node to the one of either the source node or the receiving node.

The weight pushing circuit 160, under the control of the controller 120, then inputs the weighted directed graph either from the original directed graph portion 132 or the weighted directed graph portion 138. The weight pushing circuit 160 then pushes the weights on the weighted directed graph, based on the shortest distances determined by the shortest distances determining circuit 150 and stored in the shortest distances queue portion 136, through the weighted directed graph as outlined above with respect to FIG. 8. In particular, if the weight pushing circuit 160 is to push the weights back through the weighted directed graph towards a source node, the weight pushing circuit 160 operates exactly as described above with respect to FIG. 8. If the weight pushing circuit 160 is to push the weights forward towards the receiving node, the weight pushing circuit 160 first transposes the weighted directed graph as outlined above, and stores the transposed weighted directed graph in the memory 130.

For weighted directed graphs where the weights have been pushed back towards the source node, the weight pushing circuit 160 stores the pushed weighted directed graph in the pushed weighted directed graph portion 134 under the control of the controller 120. Otherwise, if the weights have been pushed forward towards the receiving node, the weight pushing circuit 160 first inversely transposes the pushed transposed weighted directed graph to return it to the original form. Then, the weight pushing circuit 160 again stores the pushed weighted directed graph in the pushed directed graph portion 134 under the control of the controller 120.

The directed graph reweighting system 100 can then output the pushed weighted directed graph stored in the pushed directed graph portion 134 through the input/output interface 110 to either a local or a remotely-located storage location or to a local or a remotely-located system that uses the pushed weighted directed graph in some data analysis task, such as speech recognition or the like. Alternatively, the directed graph reweighting system 100 could itself be further programmed to perform the data analysis task, such as speech recognition.

In this case, for example, the controller 120 may use the pushed weighted directed graph stored in the pushed directed graph portion 134 to perform a speech recognition task over one or more utterances received from a speech utterance source 200 over a link 210 and input through the input/output interface 110. The controller 120, after using the pushed weighted graph stored in the pushed directed graph portion 134 to recognize the utterances received from the speech utterance source 200, can output the recognized utterances through the input/output interface 110 to a recognized speech sink 300 over a link 310. Thus, in this case, the shortest path analyzing system 110 is also a speech recognition system. Accordingly, the directed graph reweighting system 100 may include any known speech recognition related circuits, such as those disclosed in U.S. patent application Ser. No. 08/975,648, filed Nov. 21, 1997, here incorporated by reference in its entirety.

Figure 11:
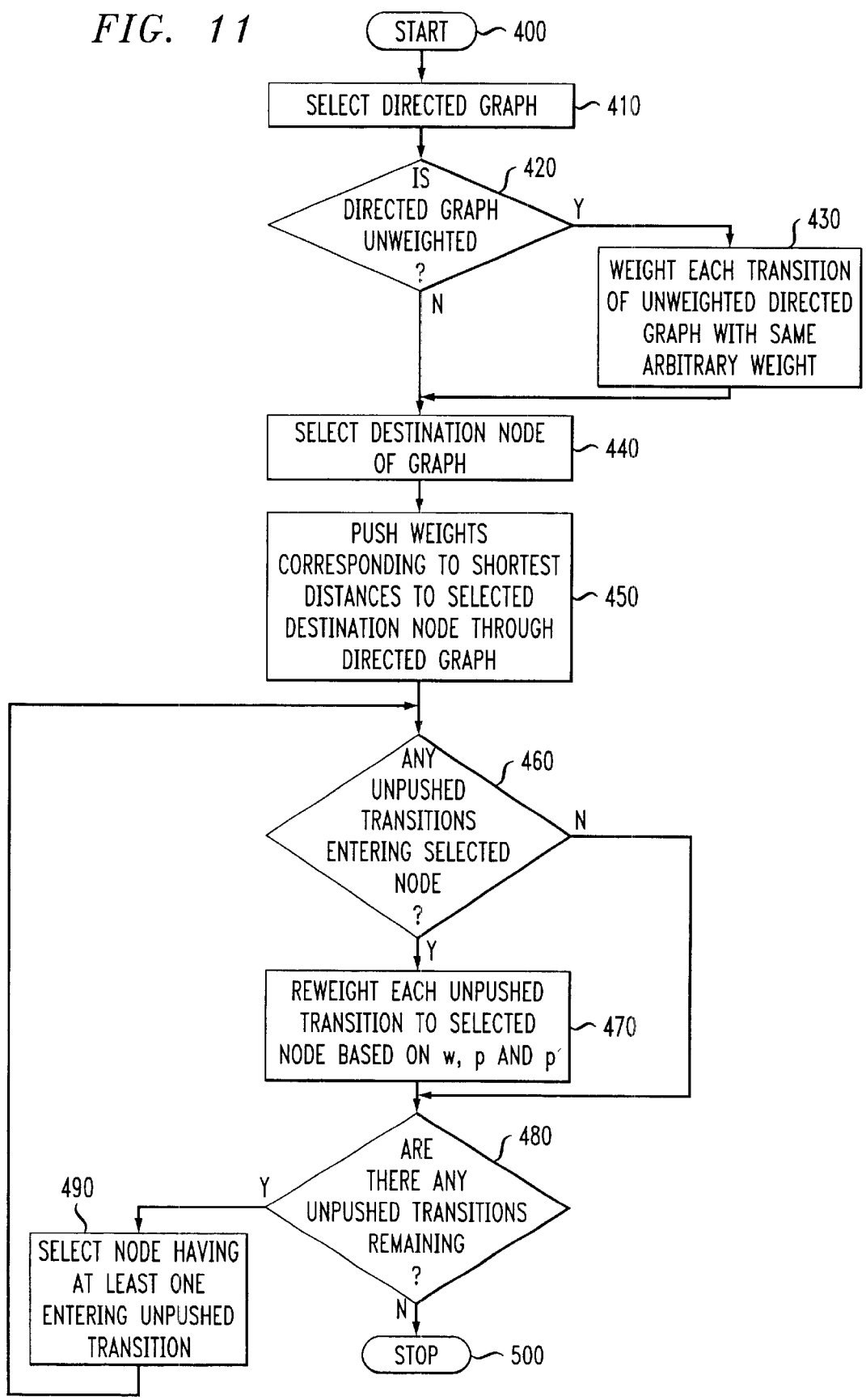
FIG. 11 is a flowchart outlining one exemplary embodiment of the methods for re-weighting a weighted directed graph according to this invention.

FIG. 11 is a flowchart outlining one exemplary embodiment of a method for reweighting a weighted directed graph according to this invention. Beginning in step 400, control continues to step 410, where a weighted directed graph to be reweighted is selected or input. Next, in step 420, a determination is made whether the selected directed graph is unweighted. If so, control continues to step 430. Otherwise, control jumps directly to step 440.

In step 430, the weight of each transition of the unweighted directed graph is weighted with an arbitrary weight. As outlined above, the arbitrary weight assigned to each transition can be the same base weight, or can be a normalized weight based on the base weight and some structural aspect of the selected unweighted directed graph, such as the total number of transitions, the total number of nodes, the number of transitions between two nodes for transitions located between those two nodes, or any other known or later developed value that represents one or more aspects of the selected unweighted directed graph. Control then continues to step 440.

In step 440, a pushing receiving node of the graph is selected as the current selected node. As outlined above, the pushing receiving node is the node towards which the weights will be pushed. This node can either be a source node located at a front portion of the weighted directed graph or a receiving node located at a end portion of the weighted directed graph. Next, in step 450, the weights corresponding to the shortest distances to the selected pushed receiving node are determined and pushed through the weighted directed graph. Next, in step 460, a determination is made if there are any unpushed transitions entering the current selected node. It should be appreciated that, in the first iteration of steps 460–490, the current selected node is the selected pushed receiving node. In step 460, if there are any unpushed transitions entering the current selected node, control continues to step 470. Otherwise, control jumps directly to step 480.

In step 470, each unpushed transition to the current selected node is reweighted based on the weight on that transition w, the weight on the node that that transition exits, pq', and the weight pushed onto the node that that transition enters $p_{q'}$. Control then continues to step 480.

In step 480, a determination is made whether there are any unpushed transitions remaining in the selected weighted directed graph. If so, control continues to step 490. Otherwise, control jumps to step 500.

In step 490, a node having at least one entering unpushed transition is selected as the current selected node. Control then returns to step 460. In contrast, in step 500, the selected weighted directed graph has been completely reweighted. The control routine for reweighting the selected graph thus ends.

Figure 12:
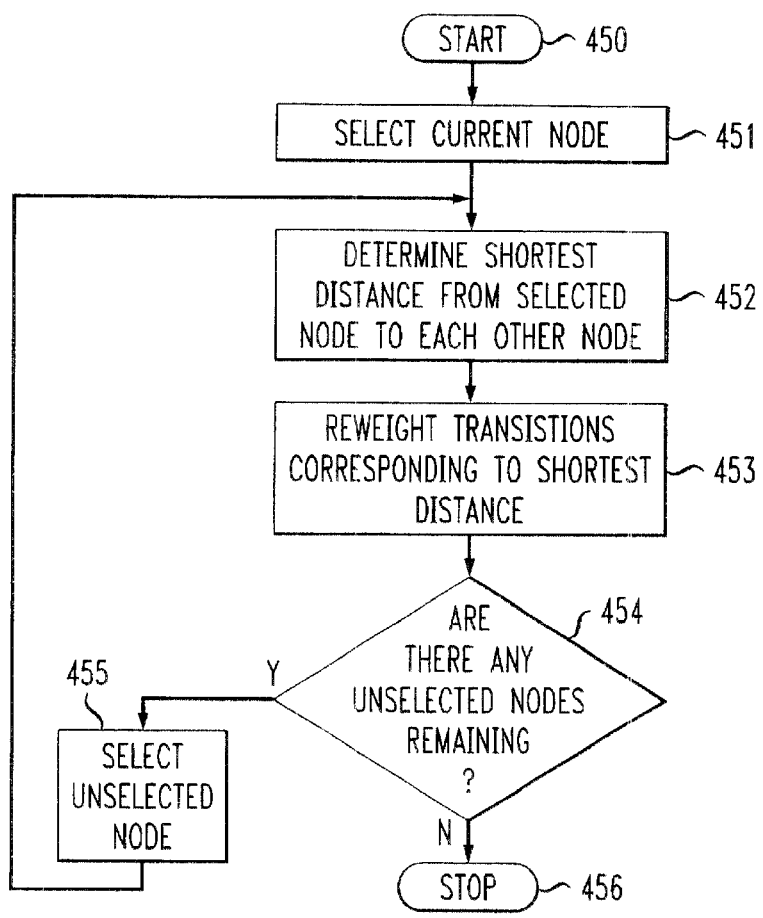
FIG. 12 is a flowchart outlining in greater detail one exemplary embodiment of the method for pushing weights through the weighted directed graph according to this invention.

FIG. 12 outlines in greater detail one exemplary embodiment of the method for determining the shortest distances to the selected node and pushing the weights corresponding to the shortest distances to the selected node through the weighted directed graph of 450. Beginning in step 450, control continues to step 451, where a node of the selected graph other than the receiving node is selected as a current source node. Then, in step 452, the shortest distance from the selected node to the current selected node and through the selected weighted directed graph is determined. Next, in step 453, the transitions corresponding to the shortest distance from the current source node to the receiving node are reweighted based on the determined shortest distance. Control then continues to step 454.

In step 454, the determination is made whether there are any unselected nodes remaining in the selected weighted directed graph. If so, control continues to step 455. Otherwise, control jumps to step 456.

In step 455, a previously unselected node is selected as the current source node. Control then returns to step 452. Otherwise, in step 456, control returns to step 460.

The directed graph reweighting system 100 shown in FIG. 10 is preferably implemented using a programmed general purpose computer. However, the directed graph reweighting system 100 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing the unweighted or weighted directed graphs, the lattices and/or the finite state automata discussed above can be used to implement the directed graph reweighting system 100. Likewise, any device capable of implementing a finite state machine that is in turn capable of implementing the flowcharts shown in FIGS. 11 and 12, can be used to implement the directed graph reweighting system 100.

The links 210 and 310 can be any known or later developed device or system for connecting the directed graph reweighting system 100 to the speech utterance source 200 and the recognized speech sink 300, respectively, Thus, the links 110 can be a direct cable connection, a connection over a wide area network or a local area network, a connection over an internet, a connection over the Internet, a connection over an extranet, or a connection over any other distributed processing network or system. Similarly, at least the link 210 can be a connection over the public switched telephone network and/or a cellular telephone network. In this case, the speech utterance source 200 can be a wired, a wireless, or a cellular telephone. In general, the links 210 and 310 can each be any known or later developed connection system or structure usable to connect the directed graph reweighting system 100 to either the speech utterance source 200 or the recognized speech sink 300, respectively.

Moreover, while FIG. 10 shows the directed graph reweighting system 100 as a separate device from the speech utterance source 200 and/or the recognized speech sink 300, the directed graph reweighting system 100 may be an integrated device. For example, the directed graph reweighting system 100, the speech utterance source 200 and the recognized speech sink 300 can be implemented as a speech recognition system and software executing on a personal computer, including a microphone that inputs utterances from a user and which stores the recognized speech as text in a word processing document.

Thus, it should be understood that each of the subsystems of the directed graph reweighting system 100 shown in FIG. 10 can be implemented as portions of a suitably programmed general purpose computer. Alternatively, each of the subsystems of the directed graph reweighting system 100 shown in FIG. 10 can be implemented as physically distinct hardware circuits within an ASIC, or using a FPGA, a PLD, a PLA or a PAL, or using discrete logic elements or discrete circuit elements. The particular form each of the subsystems of the directed graph reweighting system 100 shown in FIG. 10 will take is a design choice and will be obvious and predicable to those skilled in the art.

Stated differently, it should be understood that the directed graph reweighting system 100 shown in FIG. 10 can be implemented as software executing on a programmed general purpose computer, a special purpose computer, a microprocessor or the like. In this case, each subsystem of the directed graph reweighting system 100 can be implemented as a routine embedded in a driver, as a resource residing on a server, or the like. The directed graph reweighting system 100 can also be implemented by physically incorporating it into a software and/or hardware system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method, executing on a data processing system having a controller and a memory, for optimizing a recognition network, the recognition network comprising a plurality of nodes and a plurality of transitions connecting the nodes, comprising:

determining, for each of at least some of the nodes, shortest distances to at least one other node; and reweighting at least some of the plurality of nodes and the plurality of transitions based on the determined shortest distances, wherein said determining comprises determining single-source shortest distances from each of at least some of the nodes, wherein determining the single-source shortest distances from each of at least some of the nodes comprises:

selecting a source node "s";

defining a destination array "d" and a total weight array "r";

defining a queue "S";

adding the source node "s" to the queue "S";

extracting a node "q" from the queue "S";

relaxing, for each transition extending from the extracted node "q", the departing edges "e" of the extracted node "q"; and repeating the extracting and relaxing steps until the queue "S" is empty.

2. The method of claim 1, wherein defining the destination array "d" and the total weight array "r" comprises:

setting each element of the destination array "d" to an identity element for an $\oplus$ operation of a semiring over which the recognition network is weighted;

setting each element of the total weight array "r" to the identity element for the $\oplus$ operation; and setting the elements of the destination array "d" and the total weight array "r" for the selected source node "s" to an identity element for an $\otimes$ operation of the semiring.

3. The method of claim 1, wherein extracting the extracted node q from the queue "S" comprises:

storing a total weight value for the extracted node "q"; and setting a value in the total weight array "r" for the extracted node "q" to an identity element for an $\oplus$ operation of a semiring over which the recognition network is weighted.

4. The method of claim 1, wherein relaxing, for each transition extending from the extracted node "q", the departing edges "e" of the extracted node "q" comprises:

selecting a current edge "e" leaving the extracted node "q";

checking if a tentative shortest distance d[n[e]] for a destination node n[e] for the current edge "e" has not been updated;

if the tentative shortest distance d[n[e]] has not been updated:

updating the tentative shortest distance d[n[e]], and updating a total weight r[n[e]] for the destination node n[e] for the current edge "e";

determining if the destination node n[e] for the current edge "e" is present in the queue "S";

if the destination node n[e] for the current edge "e" is not in the queue "S", adding the destination node n[e] for the current edge "e" to the queue "S"; and repeating the selecting, checking, updating, determining and adding steps until each departing edge "e" of the extracted node "q" has been selected.

5. The method of claim 4, wherein checking if the tentative shortest distance d[n[e]] for the destination node n[e] for the current edge "e" has not been updated comprises determining if the tentative shortest distance d[n[e]] is not exactly equal to d[n[e]]$\oplus$(r$\otimes$w[e]).

6. The method of claim 4, wherein checking if the tentative shortest distance d[n[e]] for the destination node n[e] for the current edge "e" has not been updated comprises determining if the tentative shortest distance d[n[e]] differs from d[n[e]]$\oplus$(r$\otimes$w[e]) by more than an approximation factor $\epsilon$.

7. A method, executing on a data processing system having a controller and a memory, for optimizing a recognition network, the recognition network comprising a plurality of nodes and a plurality of transitions connecting the nodes, comprising:

determining, for each of at least some of the nodes, shortest distances to at least one other node; and reweighting at least some of the plurality of nodes and the plurality of transitions based on the determined shortest distances, wherein said determining comprises determining single-source shortest distances from each of at least some of the nodes, wherein determining the single-source shortest distances from each of at least some of the nodes comprises:

selecting a source node "s";

defining a destination array "d" and a total weight array "r";

defining a queue "S";

selecting a strongly connected component "X" of the recognition network in a topological order;

for each selected strongly connected component "X", adding each node "q" of the selected strongly connected component "X" to the queue "S";

extracting a node "q" from the queue "S";

relaxing, for each transition extending from the extracted node "q", the departing edges "e" of the extracted node "q", and repeating the extracting and relaxing steps until the queue "S" is empty; and repeating the topological order selecting step until each strongly connected component "X" has been selected.

8. The method of claim 7, wherein defining the destination array "d" and the total weight array "r" comprises:

setting each element of the destination array "d" to an identity element for an $\oplus$ operation of a semiring over which the recognition network is weighted;

setting each element of the total weight array "r" to the identity element for the $\oplus$ operation; and setting the elements of the destination array "d" and the total weight array "r" for the selected source node "s"

to an identity element for an $\otimes$ operation of a semiring over which the recognition network is weighted.

9. The method of claim 7, wherein adding each node "q" of the selected strongly connected component to the queue "S" comprises setting a value in the total weight array "r" for each added node "q" to an identity element for an $\oplus$ operation of a semiring over which the recognition network is weighted.

10. The method of claim 7, wherein extracting the extracted node "q" from the queue "S" comprises:

storing a total weight value for the extracted node "q"; and setting a value in the total weight array "r" for the extracted node "q" to an identity element for an $\oplus$ operation of a semiring over which the recognition network is weighted.

11. The method of claim 7, wherein relaxing, for each transition extending from the extracted node "q", the departing edges "e" of the extracted node "q" comprises:

selecting a current edge "e" leaving the extracted node "q";

checking if a tentative shortest distance d[n[e]] for a destination node n[e] for the current edge "e" has been updated;

if the tentative shortest distance d[n[e]] has not been updated:
updating the tentative shortest distance d[n[e]], and
updating a total weight r[n[e]] for the destination node n[e] for the current edge "e";

determining if the destination node n[e] for the current edge "e" is an element of the currently selected strongly connected component "X";

determining if the destination node n[e] for the current edge "e" is present in the queue "S";

if the destination node n[e] for the current edge "e" is not in the queue "S" and is not an element of the currently selected strongly connected component "X", adding the destination node n[e] for the current edge "e" to the queue "S"; and repeating the selecting, checking, updating, determining and adding steps until each departing edge "e" of the extracted node "q" has been selected.

12. The method of claim 11, wherein checking if the tentative shortest distance d[n[e]] for the destination node n[e] for the current edge "e" has not been updated comprises determining if the tentative shortest distance d[n[e]] is not exactly equal to d[n[e]]$\oplus$(r$\otimes$w[e]).

13. The method of claim 11, wherein checking if the tentative shortest distance d[n[e]] for the destination node n[e] for the current edge "e" has not been updated comprises determining if the tentative shortest distance d[n[e]] differs from d[n[e]]$\oplus$(r$\otimes$w[e]) by more than an approximation factor $\epsilon$.

14. A method, executing on a data processing system having a controller and a memory, for optimizing a recognition network, the recognition network comprising a plurality of nodes and a plurality of transitions connecting the nodes, comprising:

determining, for each of at least some of the nodes, shortest distances to at least one other node; and reweighting at least some of the plurality of nodes and the plurality of transitions based on the determined shortest distances, wherein determining, for each of at least some of the nodes, shortest distances to at least one other node comprises:

determining if at least one of the plurality of nodes and the plurality of transitions of the recognition network have been weighted; and if the plurality of nodes and the plurality of transitions of the recognition network have not been weighted, arbitrarily weighting the transitions of the recognition network.

15. The method of claim 14, wherein arbitrarily weighting the transitions of the recognition network comprises:

selecting a semiring over which the recognition network is to be weighted, and weighting each of the plurality of transitions based on an identity element for an $\otimes$ operation of the selected semiring.

16. The method of claim 14, wherein arbitrarily weighting the transitions of the recognition network comprises:

selecting a semiring over which the recognition network is to be weighted, and weighting each of the plurality of transitions based on any arbitrary value except an identity element for an $\oplus$ operation of the selected semiring.

17. The method of claim 14, wherein arbitrarily weighting the transitions of the recognition network comprises weighting each of the plurality of transitions such that distances of paths of transitions between any two nodes become directly related to a number of the plurality of transitions within each path between those two nodes.

18. A method, executing on a data processing system having a controller and a memory, for optimizing a recognition network, the recognition network comprising a plurality of nodes and a plurality of transitions connecting the nodes, comprising:

determining, for each of at least some of the nodes, shortest distances to at least one other node; and reweighting at least some of the plurality of nodes and the plurality of transitions based on the determined shortest distances, wherein reweighting at least some of the plurality of nodes and the plurality of transitions based on the determined shortest distances comprises:

selecting a source node toward which at least some of the plurality of nodes and the plurality of transitions will be reweighted;

selecting a destination node of the recognition network as a current node;

identifying at least one transition directly connected to the current node and on a path between the source node and destination node;

selecting one of the at least one identified transitions;

determining if an other node connected to the selected transition was previously reweighted;

if the other node was not previously weighted:
adding a current weight of a transition connecting the current node and the other node to the other node, and
resetting the weight of the transition connecting the current node and the other node to a predetermined value;

if the other node was previously weighted, resetting the weight of the transition connecting the current node and the other node based on the current weight of the transition, a weight of the current node and a weight of the other node;

repeating the selecting, determining adding and resetting steps for each identified transition;

selecting another node on a path between the source node and the destination node as the current node; and repeating the identifying, transition selecting, determining, adding, resetting and node selecting steps until each transition on each path between the source node and the destination node has been selected.

19. The method of claim 18, wherein the arbitrary value is equal to an identity element for an ⊕ operation of a semiring over which the recognition network is weighted.

20. The method of claim 18, wherein resetting the weight of the transition connecting the current node and the other node based on the current weight of the transition, a weight of the current node and a weight of the other node comprises resetting the weight of that transition to w', where:

$$w'=w+p_{q'}-p_q;\text{ and}$$

where:
  w is the current weight of that transition before resetting;
  $p_{q'}$ is the weight previously pushed onto the current node; and
  $p_q$ is the weight previously pushed onto the other node.

21. The method of claim 20, wherein the arbitrary value is zero.

22. The method of claim 18, wherein resetting the weight of the transition connecting the current node and the other node based on the current weight of the transition, a weight of the current node and a weight of the other node comprises resetting the weight of that transition to w', where:

$$w'=w*p_{q'}/p_q;\text{ and}$$

where:
  w is the current weight of that transition before resetting;
  $p_{q'}$ is the weight previously pushed onto the current node; and
  $p_q$ is the weight previously pushed onto the other node.

23. The method of claim 22, wherein the arbitrary value is one.

24. A method, executing on a data processing system having a controller and a memory, for reweighting a weighted directed graph stored in the memory, comprising:
  selecting a node of the weighted directed graph;
  determining at least one path extending from the selected node in a pushing direction; and
  pushing a weight of at least one transition of the at least one determined path onto at least one node of the at least one determined path,
  wherein:
    determining at least one path comprises determining at least one node directly connected to the selected node in the pushing direction; and
    pushing at least one weight comprises:
      for each determined node, if that node does not have a weight pushed onto it:
        pushing a weight of a transition directly connecting that node to the selected node on to that node, and
        setting the weight of that transition to a predetermined value, and
      for each determined node, if that node has a weight pushed onto it, modifying the weight of that transition based on a weight of that node, a weight of the selected node, and the unmodified weight of that transition.

25. The method of claim 24, wherein the predetermined weight is an identity value of an addition operator of a semiring over which the directed graph has been weighted.

26. The method of claim 24, wherein, for the log or tropical semiring, modifying the weight of that transition comprises modifying an unmodified weight w to a modified weight w' as:

$$w'=w+p_{q'}-p_q,$$

where:
  $p_{q'}$ is a weight previously pushed onto the selected node; and
  $p_q$ is a weight previously pushed onto that node.

27. A method, executing on a data processing system having a controller and a memory, for reweighting a weighted directed graph stored in the memory, comprising:
  selecting a node of the weighted directed graph;
  determining at least one path extending from the selected node in a pushing direction; and
  pushing a weight of at least one transition of the at least one determined path onto at least one node of the at least one determined path,
  wherein pushing at least one weight comprises:
    determining a single source shortest distance from the selected node to each other node of the directed graph in the pushing direction;
    pushing, for each other node of the directed in the pushing direction, the single source shortest distance for that node onto that node; and
    reweighting each transition of each path based on an original weight of that transition and weights of the nodes connected by that transition.

28. The method of claim 27, wherein determining the single source shortest distance from the selected node to each other node of the directed graph in the pushing direction comprises determining an approximate single source shortest distance.

29. A reweighting system that reweighs a recognition network having a plurality of nodes and a plurality of transitions connecting the nodes, comprising:
  a controller;
  a memory that stores the recognition network;
  a shortest distance determining circuit that determines for each of at least some of the nodes, shortest distances to at least one other node; and
  a weight pushing circuit that reweights at least some of the plurality of nodes and the plurality of transitions based on the determined shortest distances,
  further comprising a weight assigning circuit that assigns arbitrary weights to the transitions of an unweighted recognition network.

30. A method, executing on a data processing system having a controller and a memory, the memory storing a directed graph comprising a plurality of nodes and a plurality of transitions connecting the nodes, for determining, for each of at least some of the nodes, single-source shortest distances from each of at least some of the nodes, comprising:
  selecting a source node "s";
  defining a destination array "d" and a total weight array "r";
  defining a queue "S";
  adding the source node "s" to the queue "S";
  extracting a node "q" from the queue "S";
  relaxing, for each transition extending from the extracted node "q", the departing edges "e" of the extracted node "q"; and repeating the extracting and relaxing steps until the queue "S" is empty.

31. The method of claim 30, wherein determining the single-source shortest distances from each of at least some of the nodes comprises determining the single-source shortest distances from at least one final node.

32. The method of claim 31, wherein determining the single-source shortest distances from at least one final node comprises determining the single-source shortest distances from a single final node.

33. The method of claim 30, wherein defining the destination array "d" and the total weight array "r" comprises:
setting each element of the destination array "d" to an identity element for an $\oplus$ operation of a semiring over which the directed graph is weighted;
setting each element of the total weight array "r" to the identity element for the $\oplus$ operation; and
setting the elements of the destination array "d" and the total weight array "r" for the selected source node "s" to an identity element for an $\otimes$ operation of the semiring.

34. The method of claim 30, wherein extracting the extracted node "q" from the queue "S" comprises:
storing a total weight value for the extracted node "q"; and
setting a value in the total weight array "r" for the extracted node "q" to an identity element for an $\oplus$ operation of a semiring over which the directed graph is weighted.

35. The method of claim 30, wherein relaxing, for each transition extending from the extracted node "q", the departing edges "e" of the extracted node "q" comprises:
selecting a current edge "e" leaving the extracted node "q";
checking if a tentative shortest distance d[n[e]] for a destination node n[e] for the current edge "e" has not been updated;
if the tentative shortest distance d[n[e]] has not been updated:
updating the tentative shortest distance d[n[e]], and
updating a total weight r[n[e]] for the destination node n[e] for the current edge "e";
determining if the destination node n[e] for the current edge "e" is present in the queue "S";
if the destination node n[e] for the current edge "e" is not in the queue "S", adding the destination node n[e] for the current edge "e" to the queue "S"; and
repeating the selecting, checking, updating, determining and adding steps until each departing edge "e" of the extracted node "q" has been selected.

36. The method of claim 35, wherein checking if the tentative shortest distance d[n[e]] for the destination node n[e] for the current edge "e" has not been updated comprises determining if the tentative shortest distance d[n[e]] is not exactly equal to d[n[e]]$\oplus$(r$\otimes$w[e]).

37. The method of claim 35, wherein checking if the tentative shortest distance d[n[e]] for the destination node n[e] for the current edge "e" has not been updated comprises determining if the tentative shortest distance d[n[e]] differs from d[n[e]]$\oplus$(r$\otimes$w[e]) by more than an approximation factor $\epsilon$.

38. The method of claim 30, wherein determining the single-source shortest distances from each of at least some of the nodes comprises:
selecting a source node "s";
defining a destination array "d" and a total weight array "r";
defining a queue "S";
selecting a strongly connected component "X" of the directed graph in a topological order;
for each selected strongly connected component "X",
adding each node "q" of the selected strongly connected component "X" to the queue "S";
extracting a node "q" from the queue "S";
relaxing, for each transition extending from the extracted node "q", the departing edges "e" of the extracted node "q", and
repeating the extracting and relaxing steps until the queue "S" is empty; and
repeating the topological order selecting step until each strongly connected component "X" has been selected.

39. The method of claim 38, wherein defining the destination array "d" and the total weight array "r" comprises:
setting each element of the destination array "d" to an identity element for an $\oplus$ operation of a semiring over which the directed graph is weighted;
setting each element of the total weight array "r" to the identity element for the $\oplus$ operation; and
setting the elements of the destination array "d" and the total weight array "r" for the selected source node "s" to an identity element for an $\otimes$ operation of a semiring over which the directed graph is weighted.

40. The method of claim 38, wherein adding each node "q" of the selected strongly connected component to the queue "S" comprises setting a value in the total weight array "r" for each added node "q" to an identity element for an $\oplus$ operation of a semiring over which the directed graph is weighted.

41. The method of claim 38, wherein extracting the extracted node "q" from the queue "S" comprises:
storing a total weight value for the extracted node "q"; and
setting a value in the total weight array "r" for the extracted node "q" to an identity element for an $\oplus$ operation of a semiring over which the recognition network is weighted.

42. The method of claim 38, wherein relaxing, for each transition extending from the extracted node "q", the departing edges "e" of the extracted node "q" comprises:
selecting a current edge "e" leaving the extracted node "q";
checking if a tentative shortest distance d[n[e]] for a destination node n[e] for the current edge "e" has been updated;
if the tentative shortest distance d[n[e]] has not been updated:
updating the tentative shortest distance d[n[e]], and
updating a total weight r[n[e]] for the destination node n[e] for the current edge "e";
determining if the destination node n[e] for the current edge "e" is an element of the currently selected strongly connected component "X";
determining if the destination node n[e] for the current edge "e" is present in the queue "S";
if the destination node n[e] for the current edge "e" is not in the queue "S" and is not an element of the currently selected strongly connected component "X", adding the the destination node n[e] for the current edge "e" to the queue "S"; and
repeating the selecting, checking, updating, determining and adding steps until each departing edge "e" of the extracted node "q" has been selected.

43. The method of claim 42, wherein checking if the tentative shortest distance d[n[e]] for the destination node n[e] for the current edge "e" has not been updated comprises determining if the tentative shortest distance d[n[e]] is not exactly equal to d[n[e]]⊕(r⊗w[e]).

44. The method of claim 42, wherein checking if the tentative shortest distance d[n[e]] for the destination node n[e] for the current edge "e" has not been updated comprises determining if the tentative shortest distance d[n[e]] differs from d[n[e]]⊕(r⊗w[e]) by more than an approximation factor $\epsilon$.

45. The method of claim 30, further comprising:

determining if at least one of the plurality of nodes and the plurality of transitions of the directed graph have been weighted; and if the plurality of nodes and the plurality of transitions of the directed graph have not been weighted, arbitrarily weighting the transitions of the directed graph.

46. The method of claim 45, wherein arbitrarily weighting the transitions of the directed graph comprises:

selecting a semiring over which the directed graph is to be weighted, and weighting each of the plurality of transitions based on an identity element for an ⊗ operation of the selected semiring.

47. The method of claim 45, wherein arbitrarily weighting the transitions of the directed graph comprises:

selecting a semiring over which the directed graph is to be weighted, and weighting each of the plurality of transitions based on any arbitrary value except an identity element for an ⊕ operation of the selected semiring.

48. The method of claim 45, wherein arbitrarily weighting the transitions of the directed graph comprises weighting each of the plurality of transitions such that distances of paths of transitions between any two nodes become directly related to a number of the plurality of transitions within each path between those two nodes.

49. A method, executing on a data processing system having a controller and a memory, the memory storing a directed graph comprising a plurality of nodes and a plurality of transitions connecting the nodes, for ensuring the directed graph is weighted, comprising:

determining if at least one of the plurality of nodes and the plurality of transitions of the directed graph have been weighted; and if the plurality of nodes and the plurality of transitions of the directed graph have not been weighted, arbitrarily weighting the transitions of the directed graph.

50. The method of claim 49, wherein arbitrarily weighting the transitions of the directed graph comprises:

selecting a semiring over which the directed graph is to be weighted, and weighting each of the plurality of transitions based on an identity element for an ⊗ operation of the selected semiring.

51. The method of claim 49, wherein arbitrarily weighting the transitions of the directed graph comprises:

selecting a semiring over which the directed graph is to be weighted, and weighting each of the plurality of transitions based on any arbitrary value except an identity element for an ⊕ operation of the selected semiring.

52. The method of claim 49, wherein arbitrarily weighting the transitions of the directed graph comprises weighting each of the plurality of transitions such that distances of paths of transitions between any two nodes become directly related to a number of the plurality of transitions within each path between those two nodes.

\* \* \* \* \*

UNITED STATES PATENT AND TRADEMARK OFFICE
CERTIFICATE OF CORRECTION

PATENT NO. : 6,587,844 B1  Page 1 of 1
DATED : July 1, 2003
INVENTOR(S) : Mehryar Mohri It is certified that error appears in the above-identified patent and that said Letters Patent is hereby corrected as shown below:

Title page, Item [54] and Column 1, lines 1-3,
Title, delete "SYSTEM AND METHODS FOR OPTIMIZING NETWORKS OF WEIGHTED UNWEIGHTED DIRECTED GRAPHS" is replaced with
-- SYSTEMS AND METHODS FOR OPTIMIZING NETWORKS OF WEIGHTED AND UNWEIGHTED DIRECTED GRAPHS--.

Title page,
Item [57], ABSTRACT,
The last sentence, delete "Various directed graph optimizing systems and methods also arbitrarily weight an unweighted directed graph so that the shortest distance and reweighting systems and methods can be used"

Signed and Sealed this

Fourteenth Day of October, 2003

JAMES E. ROGAN
*Director of the United States Patent and Trademark Office*